US012632383B2

(12) United States Patent
Yudanov

(10) Patent No.: US 12,632,383 B2
(45) Date of Patent: May 19, 2026

(54) MODIFICATION OF PAGE TABLES IN SHARED MEMORY MODULES

(71) Applicant: Lodestar Licensing Group LLC, Evanston, IL (US)

(72) Inventor: Dmitri Yudanov, Rancho Cordova, CA (US)

( * ) Notice: Subject to any disclaimer, the term of this patent is extended or adjusted under 35 U.S.C. 154(b) by 0 days.

(21) Appl. No.: 17/752,142

(22) Filed: May 24, 2022

(65) Prior Publication Data

US 2022/0283936 A1     Sep. 8, 2022

Related U.S. Application Data

(62) Division of application No. 16/824,621, filed on Mar. 19, 2020, now Pat. No. 11,366,752.

(51) Int. Cl.
*G06F 12/02*     (2006.01)
*G06F 12/1009*     (2016.01)

(52) U.S. Cl.
CPC ...... *G06F 12/0284* (2013.01); *G06F 12/1009* (2013.01); *G06F 2212/656* (2013.01)

(58) Field of Classification Search
CPC ............. G06F 12/0284; G06F 12/1009; G06F 2212/656; G06F 2212/7201
See application file for complete search history.

(56) References Cited

U.S. PATENT DOCUMENTS

| | | | | |
|---|---|---|---|---|
| 4,951,193 A | * | 8/1990 | Muramatsu | ............. G06F 8/451 |
| | | | | 711/206 |
| 5,117,350 A | * | 5/1992 | Parrish | ................ G06F 12/0284 |
| | | | | 711/E12.013 |

| | | | | |
|---|---|---|---|---|
| 5,260,689 A | | 11/1993 | Meyers et al. | |
| 5,590,356 A | | 12/1996 | Gilbert | |
| 6,138,179 A | | 10/2000 | Chrabaszcz et al. | |
| 6,609,117 B2 | | 8/2003 | Sutherland et al. | |
| 6,665,700 B1 | * | 12/2003 | Sugisaki | ................. G06F 15/16 |
| | | | | 718/104 |
| 7,856,530 B1 | | 12/2010 | Mu | |
| 8,001,266 B1 | | 8/2011 | Gonzalez et al. | |
| 8,042,109 B2 | | 10/2011 | Johnson et al. | |

(Continued)

FOREIGN PATENT DOCUMENTS

| | | |
|---|---|---|
| CN | 103631612 | 3/2014 |
| EP | 3425499 | 7/2019 |

(Continued)

OTHER PUBLICATIONS

Bergan, et al. "Deterministic Process Groups in dOS." The ACM Digital Library, Association for Computing Machinery, 2021.

(Continued)

*Primary Examiner* — Chie Yew

(57) ABSTRACT

A memory module system with a global shared context. A memory module system can include a plurality of memory modules and at least one processor, which can implement the global shared context. The memory modules of the system can provide the global shared context at least in part by providing an address space shared between the modules and applications running on the modules. The address space sharing can be achieved by having logical addresses global to the modules, and each logical address can be associated with a certain physical address of a specific module.

20 Claims, 9 Drawing Sheets

500 activating, amongst at least one memory module, a global context used by at least one program
502 distributing, amongst the at least one memory module, code of the at least one program according to the activated global context
504 executing, at least partially, each part of the code according to a locality of virtual memory accesses of program code to the at least one memory module
506 accessing physical memory of the at least one memory module based on virtual memory addresses associated with memory accesses coded in the code
508

(56) References Cited

U.S. PATENT DOCUMENTS

| | | | |
|---|---|---|---|
| 8,151,077 | B1 | 4/2012 | Bauer et al. |
| 8,161,436 | B1 | 4/2012 | Neema |
| 8,402,061 | B1 | 3/2013 | Briggs et al. |
| 8,862,832 | B1* | 10/2014 | Cartmell .................. G06F 3/067 |
| | | | 711/148 |
| 8,943,501 | B1 | 1/2015 | Havemose |
| 9,250,891 | B1 | 2/2016 | Beranek et al. |
| 10,419,486 | B1 | 9/2019 | Portner et al. |
| 10,606,670 | B2 | 3/2020 | Zhao et al. |
| 10,929,081 | B1 | 2/2021 | Borunda et al. |
| 11,366,752 | B2 | 6/2022 | Yudanov |
| 11,436,041 | B2 | 9/2022 | Yudanov et al. |
| 11,599,384 | B2 | 3/2023 | Yudanov et al. |
| 11,836,087 | B2 | 12/2023 | Yudanov |
| 12,135,985 | B2 | 11/2024 | Yudanov et al. |
| 2004/0148491 | A1* | 7/2004 | Damron ................ G06F 9/3851 |
| | | | 712/E9.05 |
| 2004/0230687 | A1 | 11/2004 | Nakamura et al. |
| 2005/0060174 | A1 | 3/2005 | Heyward et al. |
| 2005/0116958 | A1 | 6/2005 | Walls et al. |
| 2006/0064421 | A1 | 3/2006 | Futagawa |
| 2006/0085679 | A1 | 4/2006 | Neary et al. |
| 2007/0130441 | A1 | 6/2007 | Wooten |
| 2007/0186044 | A1 | 8/2007 | Fowles |
| 2007/0214342 | A1 | 9/2007 | Newburn et al. |
| 2007/0226702 | A1 | 9/2007 | Segger |
| 2007/0233964 | A1 | 10/2007 | Robinson |
| 2008/0010431 | A1 | 1/2008 | Chang et al. |
| 2009/0265715 | A1 | 10/2009 | Erlingsson et al. |
| 2009/0307693 | A1 | 12/2009 | Do et al. |
| 2011/0125974 | A1* | 5/2011 | Anderson ......... G06F 15/17331 |
| | | | 711/E12.005 |
| 2011/0252430 | A1 | 10/2011 | Chapman et al. |
| 2012/0041914 | A1 | 2/2012 | Tirunagari |
| 2012/0047516 | A1 | 2/2012 | Barwick |
| 2012/0054753 | A1 | 3/2012 | Nagasaka et al. |
| 2012/0221785 | A1 | 8/2012 | Chung et al. |
| 2013/0198459 | A1 | 8/2013 | Joshi et al. |
| 2013/0297907 | A1 | 11/2013 | Ki et al. |
| 2014/0021555 | A1 | 1/2014 | Ishibashi et al. |
| 2014/0049551 | A1 | 2/2014 | Rao et al. |
| 2014/0122329 | A1 | 5/2014 | Naggar et al. |
| 2014/0215155 | A1 | 7/2014 | Miller et al. |
| 2014/0317634 | A1 | 10/2014 | Ishikawa et al. |
| 2014/0372356 | A1 | 12/2014 | Bilal et al. |
| 2015/0046902 | A1 | 2/2015 | Kumar et al. |
| 2015/0081978 | A1 | 3/2015 | Daly |
| 2015/0178108 | A1 | 6/2015 | Tarasuk-levin et al. |
| 2015/0309942 | A1 | 10/2015 | Moretti |
| 2016/0239236 | A1 | 8/2016 | Huang et al. |
| 2016/0373481 | A1 | 12/2016 | Sultan et al. |
| 2016/0378583 | A1 | 12/2016 | Nakano et al. |
| 2017/0017576 | A1 | 1/2017 | Cammarota et al. |
| 2017/0115994 | A1 | 4/2017 | Goodman et al. |
| 2017/0123997 | A1* | 5/2017 | Aslot .................. G06F 12/1009 |
| 2017/0180340 | A1 | 6/2017 | Smith et al. |
| 2017/0185301 | A1 | 6/2017 | Mcgiverin et al. |
| 2017/0262465 | A1 | 9/2017 | Goggin et al. |
| 2017/0357600 | A1 | 12/2017 | Moon |
| 2018/0210777 | A1* | 7/2018 | Carpentier ........... G06F 3/0613 |
| 2018/0239624 | A1 | 8/2018 | Tsirkin |
| 2018/0293087 | A1 | 10/2018 | Lee et al. |
| 2018/0295314 | A1 | 10/2018 | Sugihara |
| 2018/0302327 | A1* | 10/2018 | Anantharam ......... H04L 47/125 |
| 2018/0357175 | A1 | 12/2018 | Jiang |
| 2019/0042453 | A1 | 2/2019 | Basak et al. |
| 2019/0138919 | A1 | 5/2019 | Chen |
| 2019/0156207 | A1 | 5/2019 | Chen |
| 2019/0317843 | A1 | 10/2019 | Zhao et al. |
| 2020/0081658 | A1 | 3/2020 | Choi et al. |
| 2020/0117455 | A1 | 4/2020 | Ray et al. |
| 2020/0233279 | A1 | 7/2020 | Kikuchi et al. |
| 2020/0272566 | A1 | 8/2020 | Saeki |
| 2020/0334045 | A1 | 10/2020 | Chaiken et al. |
| 2020/0394752 | A1 | 12/2020 | Liu et al. |
| 2021/0011826 | A1 | 1/2021 | Lindquist |
| 2021/0064495 | A1 | 3/2021 | Huang et al. |
| 2021/0103462 | A1 | 4/2021 | Yudanov et al. |
| 2021/0103463 | A1 | 4/2021 | Yudanov et al. |
| 2021/0255773 | A1 | 8/2021 | Kwon et al. |
| 2021/0294746 | A1 | 9/2021 | Yudanov |
| 2021/0311732 | A1* | 10/2021 | Tanuma ................ G06F 9/3824 |
| 2021/0406145 | A1 | 12/2021 | Kelley et al. |
| 2022/0197814 | A1 | 6/2022 | Yudanov |
| 2022/0308922 | A1 | 9/2022 | Mutalik et al. |
| 2022/0413900 | A1 | 12/2022 | Yudanov et al. |
| 2023/0205575 | A1 | 6/2023 | Yudanov et al. |
| 2024/0078187 | A1 | 3/2024 | Yudanov |
| 2025/0045096 | A1 | 2/2025 | Yudanov et al. |

FOREIGN PATENT DOCUMENTS

| | | |
|---|---|---|
| JP | 2005275707 | 10/2005 |
| JP | 2008097425 | 4/2008 |
| WO | 2019171237 | 9/2019 |

OTHER PUBLICATIONS

International Search Report and Written Opinion, PCT/US2020/053529, mailed on Jan. 20, 2021.

International Search Report and Written Opinion, PCT/US2020/053532, mailed on Jan. 22, 2021.

International Search Report and Written Opinion, PCT/US2021/063834, mailed on Apr. 14, 2022.

Xiong, et al. "Memory Access Scheduling Based on Dynamic Multilevel Priority in Shared DRAM Systems." ACM Transactions on Architecture and Code Optimization, vol. 13, No. 4, Article 42, Dec. 2016.

Pramono, Subuh, et al., "Performance of Groundplane Shaping in Four-Element Dualband MIMO Antenna." Telkomnika, Mar. 2017.

Bergan, Tom, et al., "Deterministic Process Groups in dOS." OSDI 10, Oct. 4, 2015.

Xiong, Dongliang, et al., "Memory Access Scheduling Based on Dynamic Multilevel Priority in Shared DRAM Systems." TACO, Dec. 2, 2016.

Chen, Xiao-wen, et al., "Run-Time Partitioning Technique of Hybrid Distributed Shared Memory Space in Multi-core Processors." Computer Engineering and Science, abstract only, Jul. 15, 2012.

Extended European Search Report, EP20871293.5, mailed on Sep. 7, 2023.

Supllementary European Search Report, EP20872379.1, mailed on Sep. 12, 2023.

Wikipedia, "Copy-on-write." Retrieved from the Internet <https://en.wikipedia.org/w/index.php?title=Copy-onwrite&oldid=916116133> on Aug. 14, 2023.

* cited by examiner

Memory Module System
100

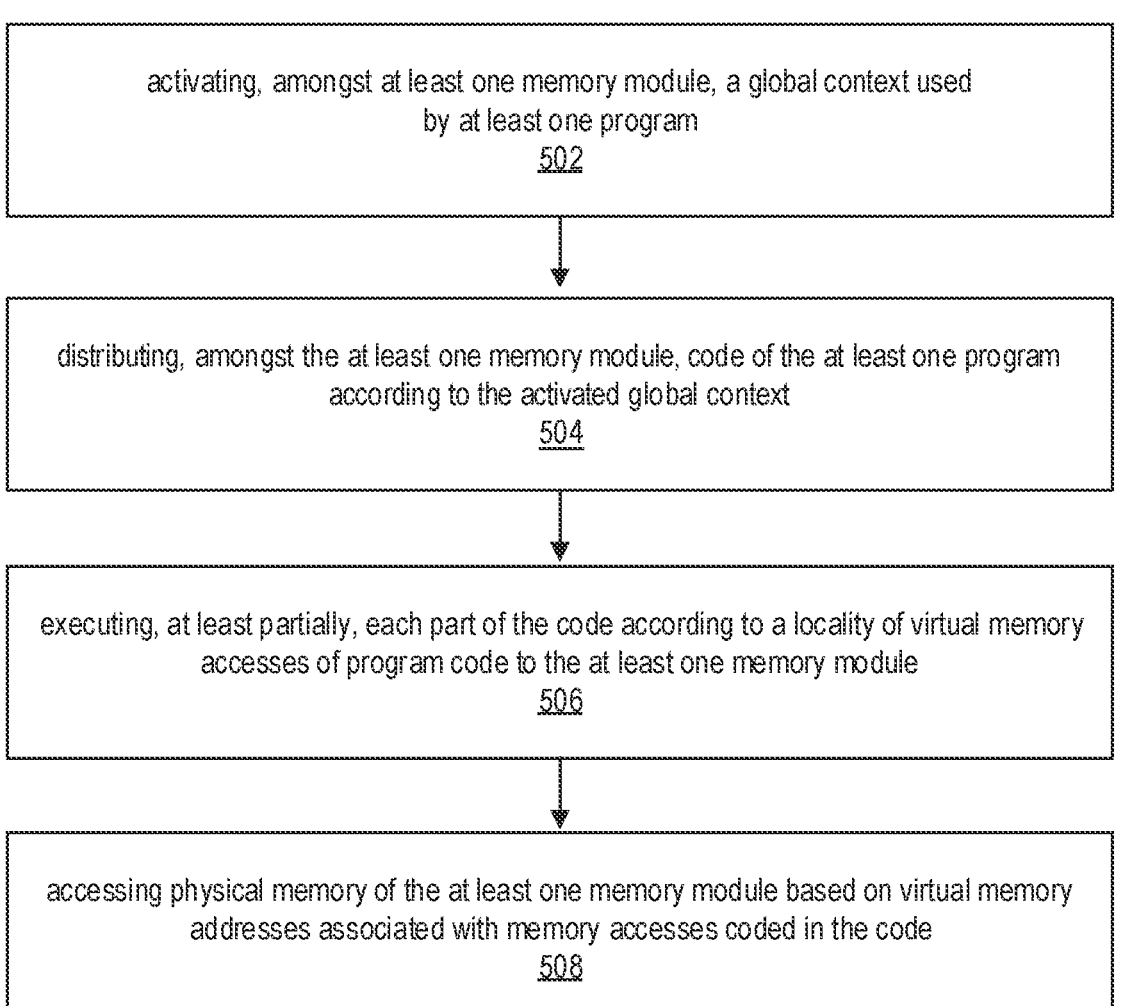

500 activating, amongst at least one memory module, a global context used
by at least one program
502 distributing, amongst the at least one memory module, code of the at least one program
according to the activated global context
504 executing, at least partially, each part of the code according to a locality of virtual memory
accesses of program code to the at least one memory module
506 accessing physical memory of the at least one memory module based on virtual memory
addresses associated with memory accesses coded in the code
508

FIG. 5

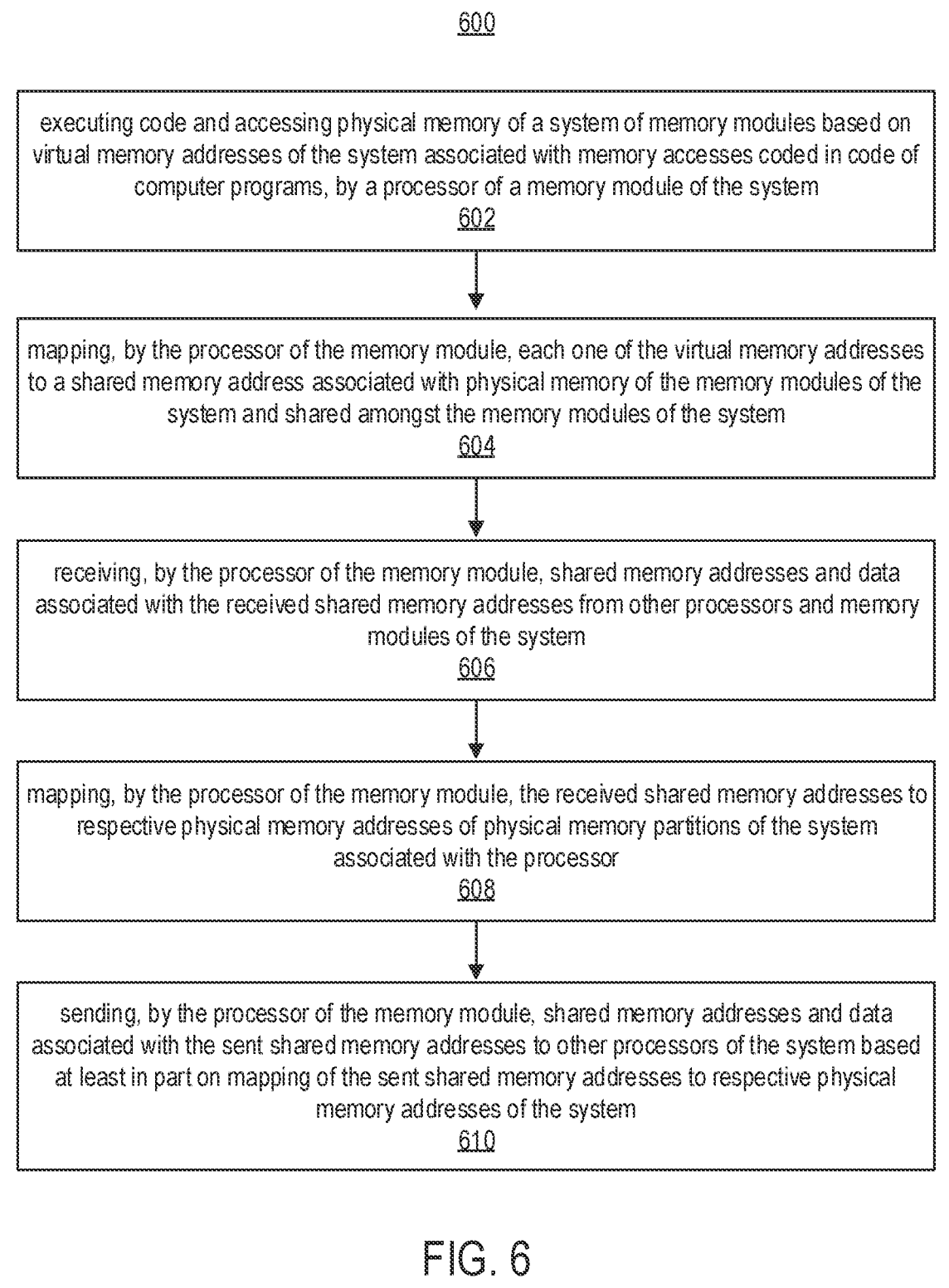

600 executing code and accessing physical memory of a system of memory modules based on virtual memory addresses of the system associated with memory accesses coded in code of computer programs, by a processor of a memory module of the system
602 mapping, by the processor of the memory module, each one of the virtual memory addresses to a shared memory address associated with physical memory of the memory modules of the system and shared amongst the memory modules of the system
604 receiving, by the processor of the memory module, shared memory addresses and data associated with the received shared memory addresses from other processors and memory modules of the system
606 mapping, by the processor of the memory module, the received shared memory addresses to respective physical memory addresses of physical memory partitions of the system associated with the processor
608 sending, by the processor of the memory module, shared memory addresses and data associated with the sent shared memory addresses to other processors of the system based at least in part on mapping of the sent shared memory addresses to respective physical memory addresses of the system
610

FIG. 6

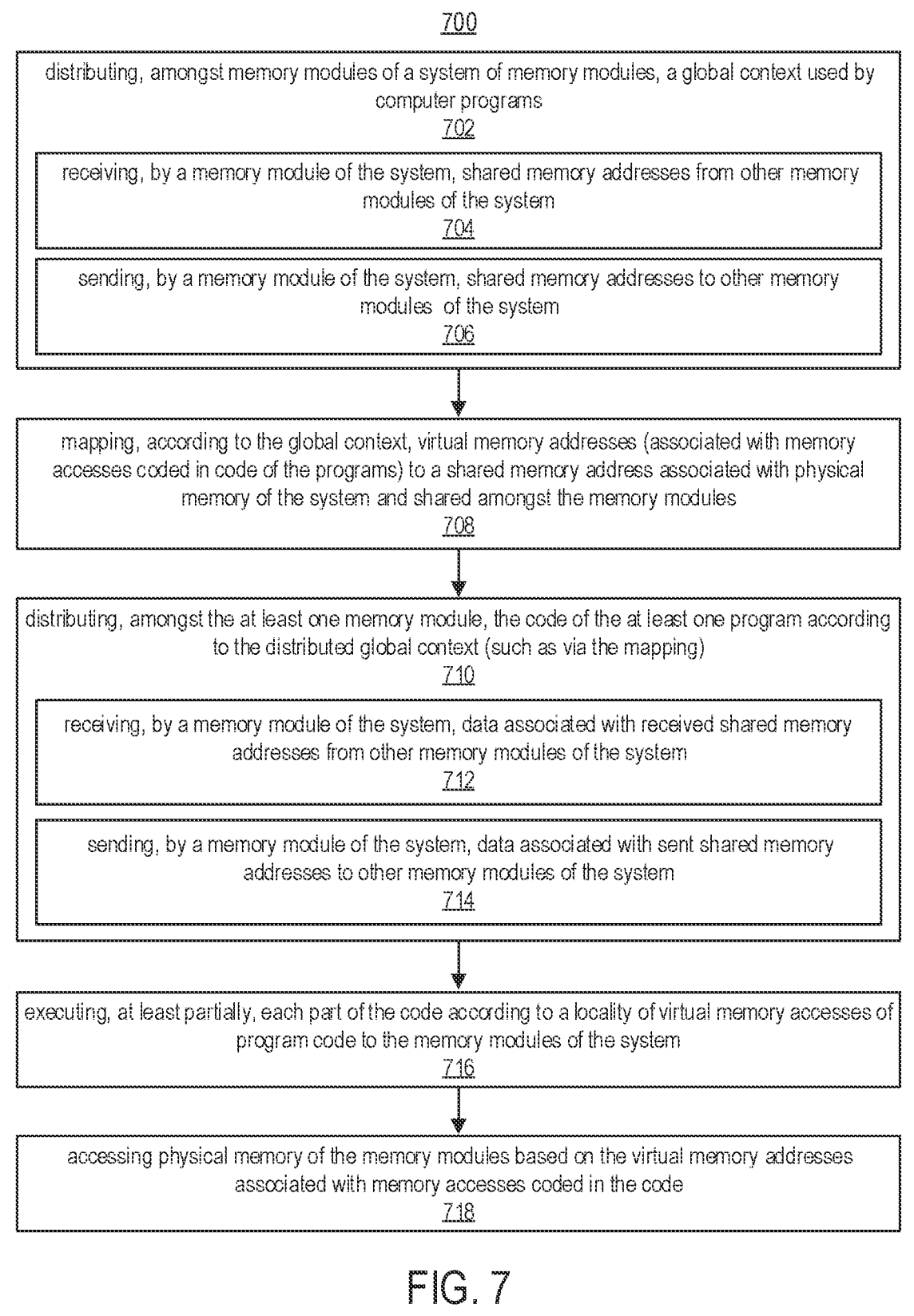

700 distributing, amongst memory modules of a system of memory modules, a global context used by computer programs
702 receiving, by a memory module of the system, shared memory addresses from other memory modules of the system
704 sending, by a memory module of the system, shared memory addresses to other memory modules of the system
706 mapping, according to the global context, virtual memory addresses (associated with memory accesses coded in code of the programs) to a shared memory address associated with physical memory of the system and shared amongst the memory modules
708 distributing, amongst the at least one memory module, the code of the at least one program according to the distributed global context (such as via the mapping)
710 receiving, by a memory module of the system, data associated with received shared memory addresses from other memory modules of the system
712 sending, by a memory module of the system, data associated with sent shared memory addresses to other memory modules of the system
714 executing, at least partially, each part of the code according to a locality of virtual memory accesses of program code to the memory modules of the system
716 accessing physical memory of the memory modules based on the virtual memory addresses associated with memory accesses coded in the code
718

FIG. 7

MODIFICATION OF PAGE TABLES IN SHARED MEMORY MODULES

RELATED APPLICATIONS

The present application is a divisional application of U.S. patent application Ser. No. 16/824,621 filed Mar. 19, 2020 and issued as U.S. Pat. No. 11,366,752 on Jun. 21, 2022, the entire disclosures of which application are hereby incorporated herein by reference.

FIELD OF THE TECHNOLOGY

At least some embodiments disclosed herein relate to a memory module system with a global shared context.

BACKGROUND

Some conventional examples of memory modules can include single in-line memory modules (SIMMs) and dual in-line memory modules (DIMMS). A SIMM differs from a dual in-line memory module (DIMM) in that the contacts on a SIMM are redundant on both sides of the module. This is not the case with a DIMM. DIMMs have separate electrical contacts on each side of the module. DIMMs are commonly used in current computers large enough to include one or more DIMMs, and a DIMM can include multiple dynamic random-access memory (DRAM) integrated circuits. For a smaller computer, such as laptop computers, often a small outline dual in-line memory module (SO-DIMM) is used.

Also, memory components can be integrated onto a system on a chip (SoC). A SoC is an integrated circuit (IC) that integrates computer components in a chip. Computer components common in a SoC include a central processing unit (CPU), memory, input/output ports and secondary storage. A SoC can have all its components on a single substrate or microchip. A SoC can include various signal processing functions and can include specialty processors or co-processors such as graphics processing unit (GPU). By being tightly integrated, a SoC can consume less power than conventional multichip systems of equivalent functionality. This makes a SoC beneficial for integration of mobile computing devices (such as in smartphones and tablets). Also, a SoC can be useful for embedded systems and the Internet of Things.

BRIEF DESCRIPTION OF THE DRAWINGS

The present disclosure will be understood more fully from the detailed description given below and from the accompanying drawings of various embodiments of the disclosure.

FIGS. 5 to 7 illustrate flow diagrams of example operations that can be performed by aspects of memory modules depicted in FIGS. 1 to 4, in accordance with some embodiments of the present disclosure.

DETAILED DESCRIPTION

Figure 1:
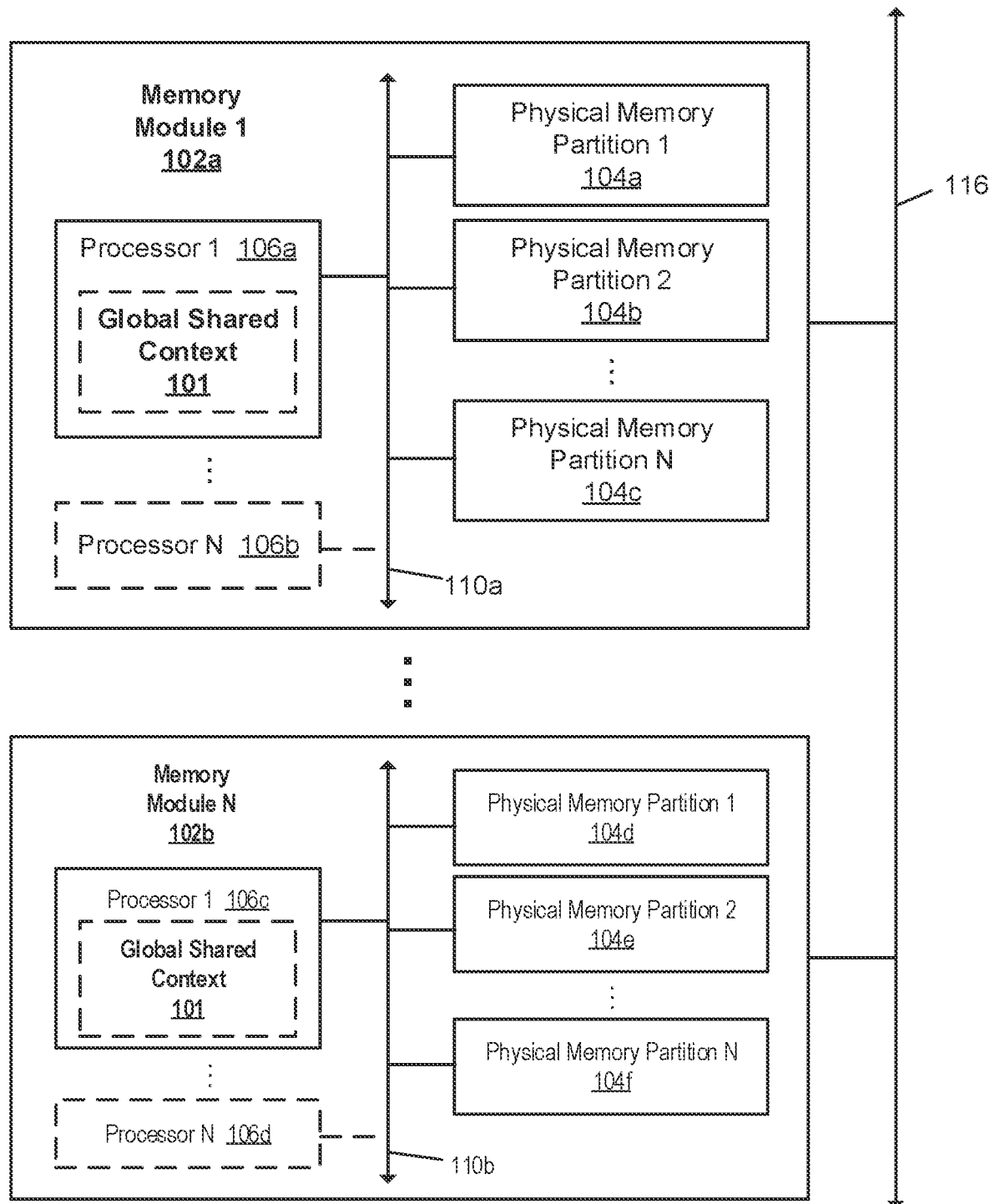
FIGS. 1 and 3 illustrate example memory module systems, in accordance with some embodiments of the present disclosure.

At least some embodiments disclosed herein relate to a memory module system with a global shared context. A memory module system can include a plurality of memory modules wherein each module is coupled with at least one processor, which can implement a global shared context. The memory module system can be, include, or be a part of a SoC or a memory module of the memory module system can be, include, or be a part of a SoC. In some embodiments, the SoC in such examples can include a central processing unit (CPU), a GPU, and/or a neural processing unit (NPU). For example, some of the memory components described herein can be integrated onto a SoC or PCB of a device, computer cluster, PC, mobile device or embedded device. Also, a SoC or PCB of a device, computer cluster, PC, mobile device or embedded device can be integrated into some of the memory components describe herein.

The memory modules of the system can provide address space shared between the modules and applications running on the modules and/or coupled processors. The address space sharing can be achieved by having logical addresses global to the modules, and each logical address can be associated with a certain physical address of a specific module. In some embodiments, the logical address space can be the same size as a sum of physical address spaces of the modules in the memory module system. For example, if there are eight modules, then association (or mapping) from logical to physical addresses can be achieved by a predetermined first group of 3 bits at a predetermined position in a code or address space (e.g., 3 bits provides 2^3 numbers or eight numbers—one number for each module of the eight modules). The rest of the logical address bits or part of them (such as a second group of bits) can be mapped to a specific physical address within each module using a second mapping scheme. In this respect, these groups of bits (first and second) do not have to be contiguous (e.g., adjacent bits within an address) and can change dynamically or on demand depending on the decisions made by a system (such as an operating system) and/or a user. The second mapping scheme can be as simple as one-to-one mapping. The third mapping scheme can be more complex such as round robin among the banks of each memory device in the module, modulus on the module ID, or interleaved, etc.

An application running on an embodiment of the memory module system can have its own virtual address space. Association between virtual spaces of various applications and logical address space can be implemented through page tables in some embodiments. Such tables can provide virtual to logical addressing and can further associate a physical address at each module. The page tables can be readable and modifiable by the processors of the memory modules, and the page tables can be stored among the modules. Alternatively, a predetermined schema and/or algorithm of how virtual addresses map to logical and/or physical addresses can be used. Example of such a schema can include set associativity such as set associativity used by set-associative caches. Also, association between virtual spaces of various applications and logical address space can be implemented through page tables, or a predetermined schema and/or algorithm, or a combination thereof.

In some embodiments, to support association between virtual spaces of various applications and a logical address space, the system can use synchronization primitives and/or semantics. The memory module system can also use messaging (e.g., point-to-point, broadcast, multicast, targeted by certain IDs, etc.) and/or atomic operations on critical data. Such functionality can be implemented via respective hardware mailboxes at each module. For example, mailboxes can be implemented at a processor at each memory module of the system or at each memory bank of a module.

In some embodiments, a lot of sharing can occur due to the global shared context being effective and applications using the system can be composed of various components, shared libraries, etc. And, this is especially the case in some examples where the applications can have the same origin or root process. Thus, when forking a process, instead of copying context, the context can be extended by reserving a share in a logical address space that supports the global context. Since the context is global, the processors associated with memory modules do not need to context-switch amongst many applications. Virtual contexts can be cached and persist in the memory module system (in contrast to context switch done by centralized processor architecture). The virtual contexts can be executed by multiple processors of memory modules in logical space with help of synchronization primitives and addressing. Even if a single application context is distributed among several memory modules, it is possible to execute it in synchrony via such mechanisms.

In some embodiments, a graphics pipeline (e.g., a graphics pipeline for geometry, projection, lighting, clipping, rasterization, shading, screen streaming and/or other functions) can be distributed between several memory modules of the system. Since, in some embodiments, each memory module can include an SoC with a GPU, the pipeline can be executed via single instruction multiple data (SIMD) operations and/or via data exchange between the modules with high-bandwidth wired and/or wireless interconnect.

In some embodiments, to execute efficiently task-level parallelism (such as for multiple applications) each processor on each memory module can simply move from context to context cached in memory; and thus, each processor can continuously run bytecode of applications in a logical space. In this sense, an operating system (OS) of a device and running applications can be merged together representing a global shared context. The value of that shared context is when it is placed in memory, especially non-volatile memory, it continuously evolves and persist there according to the user using the device or a system that includes memory modules.

Figure 2:
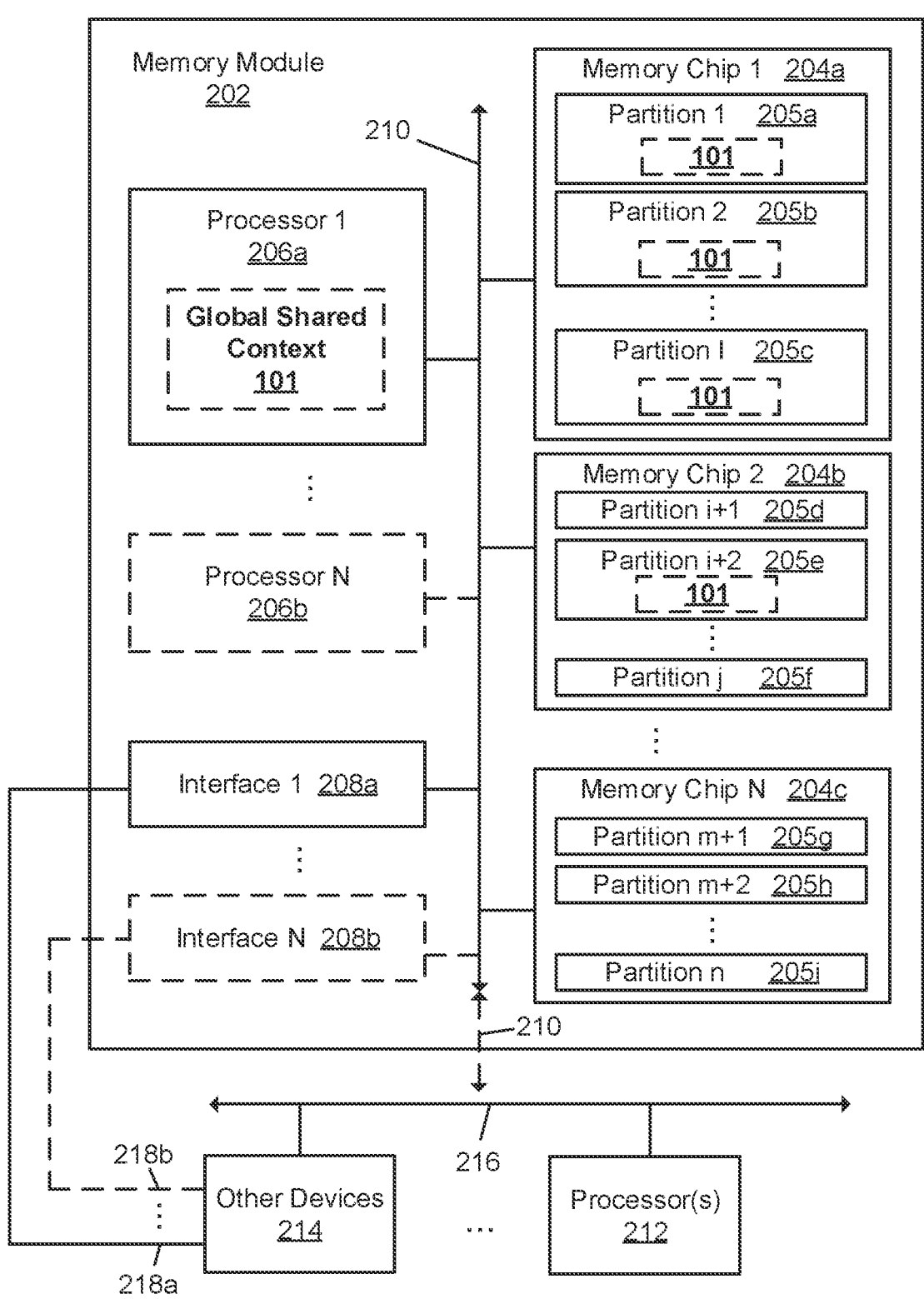
FIG. 2 illustrates an example memory module, in accordance with some embodiments of the present disclosure.
Figure 3:
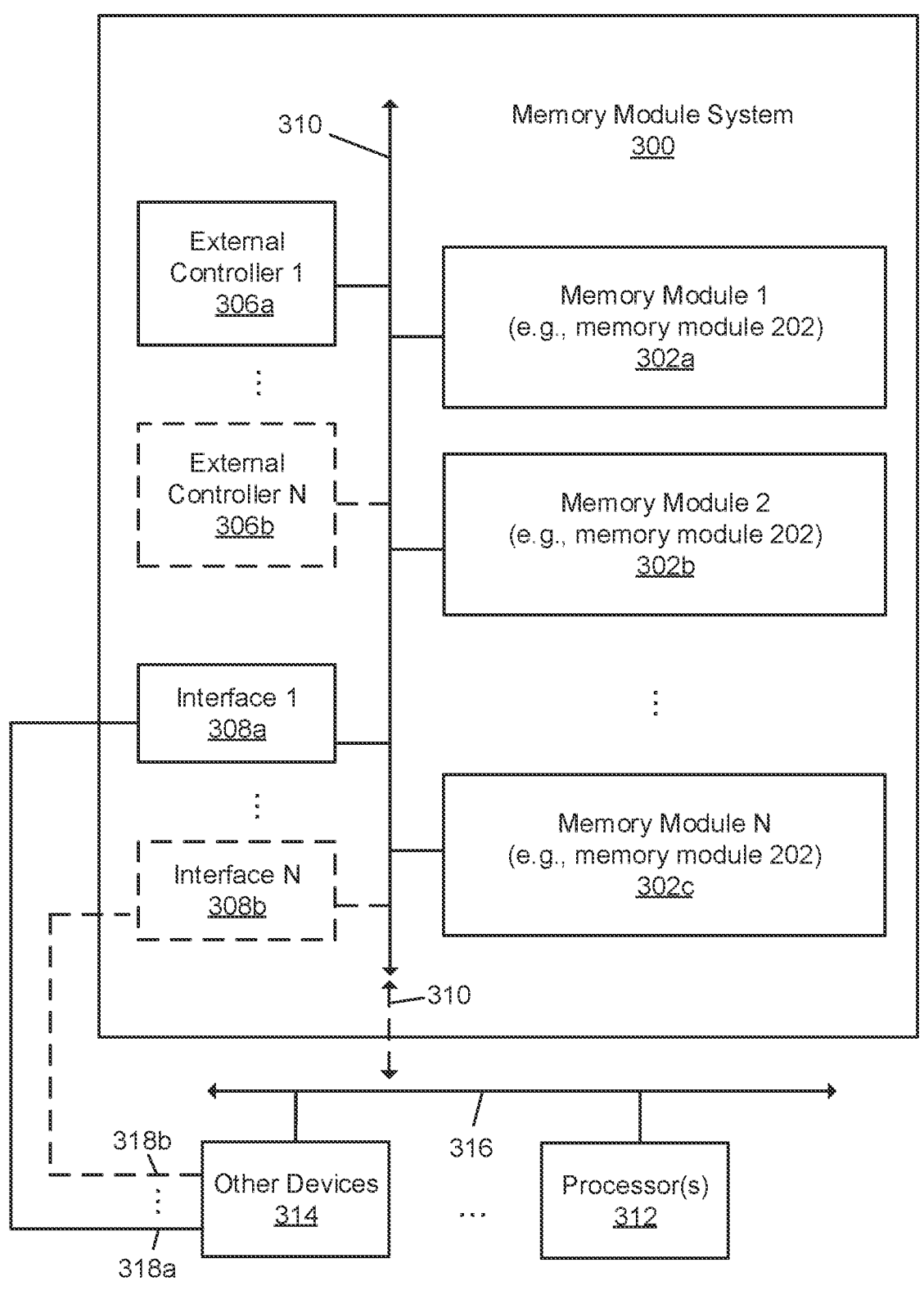

FIGS. 1 and 3 illustrate example memory module systems 100 and 300, in accordance with some embodiments of the present disclosure. FIG. 2 illustrates an example memory module 202, in accordance with some embodiments of the present disclosure. The memory module 202 can be a module of the system 100 or the system 300. FIGS. 1 and 2 illustrate example memory modules 102a, 102b, and 202 respectively, in accordance with some embodiments of the present disclosure. And, such modules can be part of the system 100 or the system 300.

FIG. 1 shows a memory module system 100 having a plurality of memory modules (e.g., see memory modules 102a and 102b) that can at least in part implement a global shared context 101 (such as via at least processors of the memory module system—e.g., see processors 106a, 106b, 106c, and 106d). Also, FIG. 1 shows that each of the memory modules of the system 100 has a plurality of physical memory partitions (e.g., see physical memory partitions 104a, 104b, 104c, 104d, 104e, and 104f). Each memory module of the system 100 also has at least one processor (e.g., see processors 106a, 106b, 106c, and 106d). As shown, different embodiments of the memory module system 100 can have memory modules wherein each memory module can have one processor (e.g., processor 106a), two processors (e.g., processors 106a and 106b), or more than two processors. It is to be understood that the dashed-lined boxes represent optional components. Also, it is to be understood that an embodiment of a memory module in the memory module system 100 can have two physical memory partitions or more than two physical memory partitions.

Each memory partition can be composed of element of a memory subsystem or architecture, such as memory dies, memory banks and ranks, memory chips, memory arrays and subarrays, memory rows and columns, memory decks and stacks.

Each memory module of the system 100 is also shown having a bus (e.g., see busses 110a and 110b, wherein each bus can include multiple busses) that connects the plurality of physical memory partitions of the memory module (e.g., see physical memory partitions 104a to 104c and physical memory partitions 104d to 104f) and the processor(s) of the module (e.g., see processors 106a to 106b and processors 106c to 106d). A bus of a memory module (e.g., see busses 110a and 110b) can be a part of a bus of the memory module system 100 (e.g., see one or more busses 116). The one or more busses 116 can connect each memory module of the memory module system 100 to each other as well as other parts of the memory module system. The one or more busses 116 can also connect the memory module system 100 and parts of the memory module system to other parts of a host system hosting the memory module system. The memory module system 100 can be a part of the host system and be installed in the host system in some examples. Also, one or more of the processors of each memory module of the memory module system 100 (e.g., see processors 106a to 106b and 106c to 106d) can arbitrate data communicated over buses of the system 100 (e.g., see busses 110a, 110b, and 116).

In some embodiments, as shown in FIGS. 1 to 3, a memory module system (e.g., see memory module systems 100 and 300) includes a plurality of memory modules (e.g., see memory modules 102a to 102b and memory modules 302a, 302b, and 302c), and each memory module of the plurality of memory modules (e.g., see memory modules 102a, 102b, and 202) includes a plurality of physical memory partitions (e.g., see partitions 104a to 104c, partitions 104d to 104f, and partitions 205a, 205b, 205c, 205d, 205e, 205f, 205g, 205h, and 205i). Each partition of the plurality of physical memory partitions can be associated with at least one physical memory address. Also, in such embodiments, the memory module system includes at least one processor (e.g., see processors 106a to 106, 106c to 106d, and 206a to 206b). Each processor of the memory module system can be associated with at least one physical memory partition of the plurality of physical memory partitions.

In such embodiments and others, each processor of the memory module system (e.g., see processors 106a to 106 and 106c to 106d of system 100) can be configured to execute code and access physical memory of the system (such as the physical partitions of memory of the system) based on virtual memory addresses associated with memory accesses coded in the code, wherein the code can be the code of a program, application, software module, or library or be a part of an operating system (OS), etc. Each processor of the system (e.g., see processors 106a to 106 and 106c to 106d of system 100) can also be configured to map each one of the virtual memory addresses to a shared memory address associated with physical memory of the plurality of memory modules and shared between the plurality of memory modules. In some examples, each processor of the system can be configured to map each one of the virtual memory addresses to a shared memory address associated with at least one partition of physical memory of the plurality of memory modules and shared between the plurality of memory modules (e.g., see partitions 104a to 104c, partitions 104d to 104f, and partitions 205a to 205i). A global shared context (e.g., see global shared context 101) can include any one of the aforesaid mapping done by a processor of the memory module system.

In such embodiments and others, each processor of the memory module system (e.g., see processors 106a to 106b of system 100) can be configured to receive shared memory addresses and data associated with the received shared memory addresses from other processors and memory modules of the memory module system (e.g., see processors 106c to 106d of system 100). Each processor of the memory module system can also be configured to map the received shared memory addresses to respective physical memory addresses of physical memory partitions of the system associated with the processor. The global shared context (e.g., see global shared context 101) can include the mapping of the received shared memory addresses to respective physical memory addresses of physical memory partitions of the system associated with the processor. Each processor of the memory module system (e.g., see processors 106a to 106b of system 100) can also be configured to send shared memory addresses and data associated with the sent shared memory addresses to other processors of the system (e.g., see processors 106c to 106d of system 100) based at least in part on mapping of the sent shared memory addresses to respective physical memory addresses of the system. The global shared context (e.g., see global shared context 101) can include the mapping of the sent shared memory addresses to respective physical memory addresses of the system associated with the processor (such as respective physical memory partitions of the system associated with the processor).

In such embodiments and others, each shared memory address of the system (e.g., see memory module systems 100 and 300) can include a sequence of bits, and the mapping of a shared memory address to a physical memory address can be based at least partly on a value of predetermined bits in the sequence of bits (such as a sequence of bits in a mapping scheme). For example, the memory modules of the memory module system can provide address space shared between the modules and applications running on the modules and/or coupled processors; and, such a shared address space can be a part of the global shared context (e.g., see global shared context 101). The address space sharing can be achieved by having logical addresses global to all modules, which each logical address is associated with a certain physical address of a specific module. Thus, in some embodiments, the logical address space can be the same size as a sum of physical address spaces of the modules in the memory module system. For example, if there are eight modules, then association (or mapping) from logical to physical addresses can be achieved by a predetermined first group of 3 bits at a predetermined position of address bits of logical and shared memory addresses associated with virtual memory addresses coded in a code or address space (e.g., 3 bits provides 2^3 numbers or eight numbers—one number for each module of the eight modules). The rest of the logical and shared address bits or a part of them (such as a second group of bits) can be mapped to a specific physical address within each module using a second mapping scheme. The second mapping scheme can be as simple as one-to-one mapping or more complex scheme such as round robin among the banks of each memory device in the module, or interleaved, etc.

Figure 8:
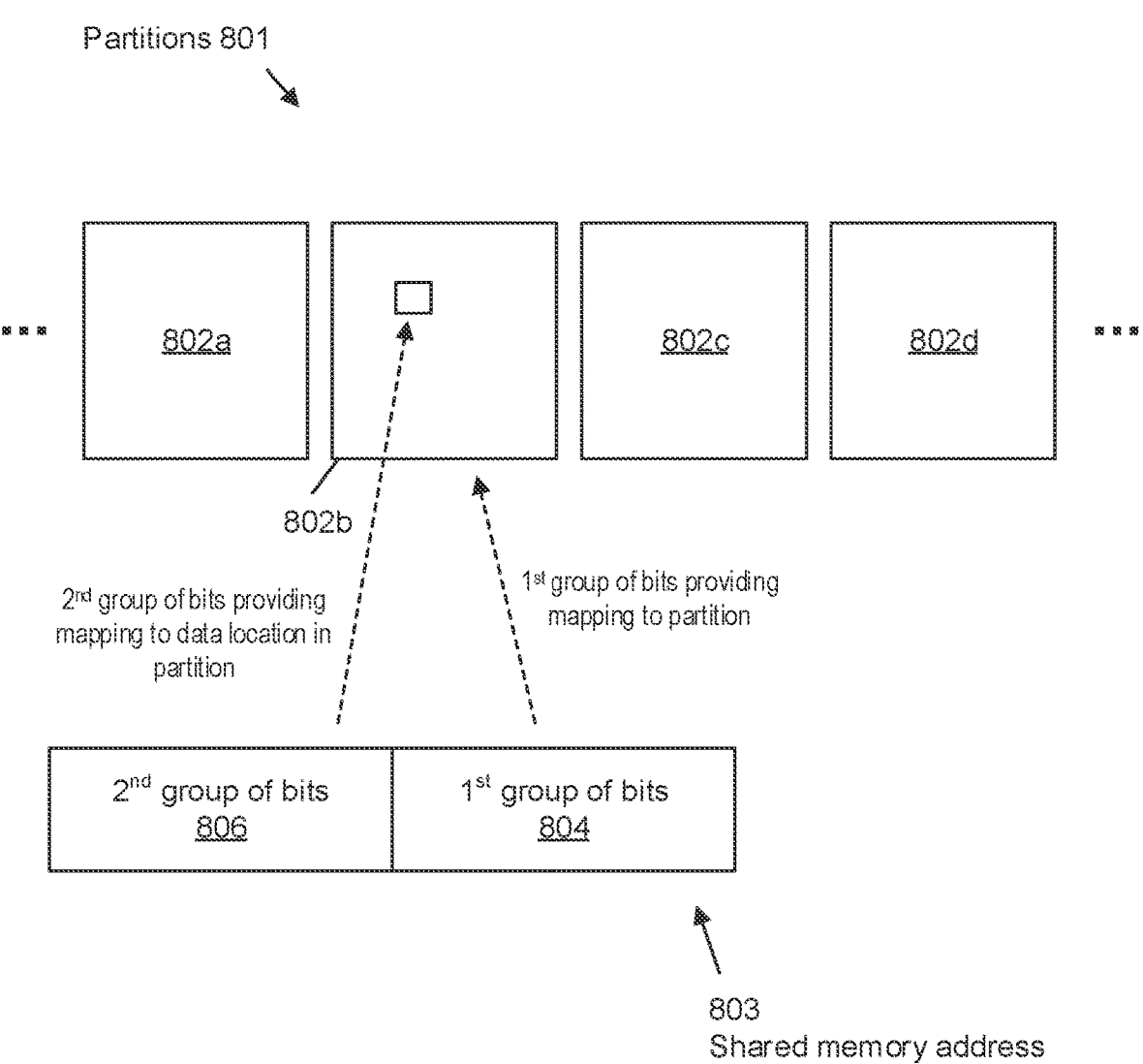
FIGS. 8 to 9 illustrate example physical memory partitions and groups of bits of a shared memory address that map to at least one partition and at least one data location in the partition, in accordance with some embodiments of the present disclosure.

In some embodiments, the predetermined bits of the sequence of shared address bits can include two or more groups of bits (e.g., see FIG. 8). The sequence of bits can be a part of a mapping scheme which can be a part of the global shared context (e.g., see global shared context 101). A first group of the predetermined bits can provide mapping to a physical memory partition of the plurality of physical memory partitions of the plurality of memory modules (e.g., see partitions 104a to 104c, partitions 104d to 104f, and partitions 205a to 205i and see first group of bits 804 mapping to partition 802b in FIG. 8), and a second group of the predetermined bits can provide mapping to a data location within the physical memory partition (e.g., see second group of bits 806 mapping to a data location within the partition 802b in FIG. 8). The data location within a partition can be at a specific memory bank, rank, or memory array, or row or column or cache line or a byte or a sequence of bytes or a combination of thereof. In such examples and others, the predetermined bits can include four groups of bits (e.g., see FIG. 9). A third group of the predetermined bits can provide mapping to a cache set that includes one or more physical memory partitions of the plurality of physical memory partitions of the plurality of memory modules (e.g., see third group of bits 808 mapping to a cache set divided amongst at least partitions 802b and 802c in FIG. 9), and values of a fourth group of predetermined bits at least in part can provide tag information for respective cache sets (e.g., see fourth group of bits 810 providing tag information for the cache set divided amongst at least partitions 802b and 802c in FIG. 9).

In some embodiments, mapping of the virtual memory addresses of the system (e.g., see systems 100 and 300) to shared memory addresses of the system is based on page tables. The page tables can be a part of the global shared context (e.g., see global shared context 101). Each entry in the page tables can provide a mapping of a virtual memory address to a shared memory address. The page tables can be readable and modifiable by the processors of the system (e.g., see processors 106a to 106b, 106c to 106d, and 206a to 206b), and the page tables can be stored in the plurality of physical memory partitions of the plurality of memory modules (e.g., see partitions 104a to 104c, partitions 104d to 104f, and partitions 205a to 205i). The page tables may be cacheable at least partly by the processors for faster access to the recently or frequently used page table entries. In some embodiments, page tables can be implemented as databases (e.g. SQL or a custom database). Accesses to these database entries can be implemented by accelerated hardware, which can be a part of a memory controller. Physical memory locations for storing these databases can be different or separate from the physical memory allocated to the global shared context.

In such embodiments and others, each memory module of the plurality of memory modules (e.g., see memory modules 102a to 102b, memory module 202, and memory modules 302a to 302c) can maintain a respective part of the page tables, and a respective part of the page tables for a given memory module of the memory module system provides mapping for physical memory addresses of the given memory module. Modifications to the page tables can occur via a modifying device communicating messages to the plurality of memory modules (e.g., the modifying device can be at least one external controller such as external controllers 306a to 306b shown in FIG. 3 or it can be another memory module or processor of a memory module associated with at least one memory partition of a memory module or any other device using the global shared context), and the messages can contain the modifications. The messages can be communicated to the plurality of memory modules based on a respective part of the page tables that is to be modified, and each one of the memory modules can be configured to send a confirmation to the modifying device that a communicated message has been received and a respective modification has been made or modification has been rejected along with a reason for the denial. In other examples, silence in response to the modifying message can mean the agreement and only denial messages are sent by receiving module.

Alternatively, each memory module of the plurality of memory modules (e.g., see memory modules 102a to 102b, memory module 202, and memory modules 302a to 302c) can maintain page tables for itself and other memory modules of the memory module system. In such examples, the modifications to the page tables can occur via a modifying device broadcasting messages to the plurality of memory modules (e.g., the modifying device can be at least one external controller such as controllers 306a to 306b shown in FIG. 3 or it can be another memory module or processor of a memory module associated with at least one memory partition of a memory module or any other device using the global shared context), and each one of the plurality of memory modules can perform the modifications to the page tables on its copy of the page tables. Thus, modifications are done by mutual agreement since at least some of the time the modifications are done by modifying device to their own set of page tables, and hence the conflicts are minor. In a case of a rare conflict any device can respond with a message along with a reason for the denial or a request for further negotiation.

An application running on an embodiment of the memory module system (e.g., see memory module systems 100 and 300) can have its own virtual address space (such as a virtual address space included in the global shared context, e.g., see global shared context 101). Association between virtual spaces of various applications and logical address space can be implemented through page tables such as the page tables described herein. In short, such tables can provide virtual to logical and shared addressing (such as through an associated physical address at each module). And, the page tables can be readable and modifiable by the processors of the memory modules, and the tables can be stored among the modules. Alternatively, a predetermined schema and/or algorithm of how virtual addresses map to logical and shared and/or physical addresses can be used. Example of such a schema can include set associativity such as set associativity used by set-associative caches. Also, association between virtual spaces of various applications and logical and shared address space can be implemented through page tables, or a predetermined schema and/or algorithm, or a combination thereof.

In embodiments using page tables, the access via the modules can occur by each module having a part of the page tables such that the part provides mapping only for physical addresses of that module and the associated logical address of the module. The modifications to such distributed page tables can occur via broadcasting a message containing such modification from a modifying device (or host processor) to all modules, wherein only the module that contains the part of page tables it is responsible to maintain that part of the tables. The modifications to such distributed page tables can occur via sending a direct message to a responsible module. In such examples, a confirmation may be provided to a requester by an updated memory module after a modification occurs or there is a denial of the update.

Alternatively, each module can have page tables for itself and all other modules in the memory module system. The modifications to such global (and always synchronized) page tables occur via broadcasting a message containing a modification from a modifying module (or host processor) to all other modules of the system, wherein all modules perform the modification on their own respective page tables. In such examples, each module has a replica of the page tables of all other modules of the memory module system. In such embodiments, confirmation messaging is not used since updates to the page tables are done by mutual agreement between the modules of the system. In some examples, such as when there is an error, a secondary message from a module can notify the other modules of the error. Thus, the other modules can then object the error synchronously. In the case of an error, the modules can act by mutual agreement to revert a modification. In examples, where it is not possible to revert a modification, the system can run a shootdown subroutine, such as a translation lookaside buffer (TLB) shootdown.

In some embodiments using a predetermined schema and/or algorithm of how virtual addresses map to logical and/or physical addresses, each virtual memory address of the memory module system can include a first sequence of bits. And, each shared memory address of the system can include a second sequence of bits. The mapping of the virtual memory addresses of the system to the shared memory addresses of the system can be based at least partly on mapping the first sequences of bits to the second sequences of bits and the second sequences of bits to the first sequences of bits. In such examples, the first sequence of bits of a virtual memory address of the system is at least in part offset with a second sequence of bits of a shared memory address of the system. Also, the second sequence of bits of a shared memory address of the system can be for a cache address of a cache, and the cache can include a group of physical memory partitions of the plurality of physical memory partitions of the plurality of memory modules. Further, in some embodiments, the cache is a set-associative cache.

The arrangement of the first and second sequences of bits can be offset from each other or a formula containing an offset can be used. Thus, it is possible to map an address range of some shared app or module shared among many applications. For example, an address range shared app or module can be fixed in the global shared context but it can be different in virtual space of apps that are using it via sharing. The difference is in the offset or a formula containing the offset. For example, if in global shared context, the shared module is mapped to the address range 30-40 and two applications, using it in their virtual address space, can have it mapped via offset: for the first application offset+100 (130-140) and for the second+1000 (1030-1040). In such an example, applications using the global shared context can map any range to their available virtual address space range by a simple offset or a formula containing an offset. Since virtual address space is flexible then an application can find a free range for mapping. The application compiler or interpreter or a hypervisor can provide semantics for integrating offset-based mapping into the app's framework.

In some embodiments using a predetermined schema and/or algorithm of how virtual addresses map to logical/shared and/or physical addresses, each memory bank in each memory module of the system (or at least some memory banks in at least some of the modules of the system) can perform a role of a set identified by a first group of bits of a virtual address at predetermined positions and mapping that number to a bank-module number. For example, if there are 1024 banks per module and 8 modules there are 8192 sets. Since $8192=2^13$, 13 bits can be used for a virtual address in the first group of bits. The rest of the virtual address bits or part of them, such as a second group of bits, are mapped to a specific physical address within each set. This second group can be or include a tag group. The tag is stored together with data, and tag matching can be performed to identify if data associated with address is cached in a set.

In such embodiments, large caches can be formed in the memory module system, and such caches can store a relatively large amount of data. For example, caches can store up to the memory capacity of the memory partitions of the memory modules. In such an example, serial-attached SCSI (SAS), SATA, M.2 or PCIe-attached solid-state drives (SSD) can be coupled to such a cache. Also, in such examples, all or most processes can be running on memory and executed applications can be entirely cached in the large caches. In addition, each cache set or at least some of the sets can migrate or cache data from other cache sets. Migrating or caching data from other cache sets can occur via changing association (e.g., bit positions) of first or second groups of bits for a specific cached virtual context.

In such embodiments and others, the global shared context (e.g., see global shared context 101) can include a virtual address memory space of a plurality of applications. The virtual address memory space of the plurality of applications can include shared memory addresses of forked processes of the plurality of applications or merged processes of the plurality of applications. A forked process is created by forking a process from at least one parent, and a merged process is created by merging processes from at least two parent processes. Also, the plurality of memory modules of the system (e.g., see memory modules 102a, 102b, 202, and 302a to 302c) can include a plurality of synchronization primitives used to synchronize memory access operations of the plurality of memory modules for the plurality of applications.

In some embodiments, a lot of sharing can occur due to the global shared context (e.g., see global share context 101) being effective and applications using the system can be composed of various components, shared libraries, etc. And, this is especially the case in some examples where the applications can have the same origin or root process. Thus, when forking a process, instead of copying context, the context can be extended by reserving a share in a logical address space that supports the global context. Since the context is global, the processors associated with memory modules do not need to context-switch between many applications. Virtual contexts can be cached and persist in the memory module system (in contrast to context switch done by centralized processor architecture). The virtual contexts can be executed by multiple processors of memory modules in logical and shared space with the help of synchronization primitives and addressing. Even if a single application context is distributed between several memory modules, it is possible to execute it in synchrony via such mechanisms.

Also, in such embodiments and others, parts of a graphics processing pipeline can be distributed between the plurality of memory modules. In some embodiments, a graphics pipeline (e.g., a graphics pipeline for geometry, projection, lighting, clipping, rasterization, shading, screen streaming and/or other functions) can be distributed between several memory modules of the system. Since, in some embodiments, each memory module can include an SoC with a GPU, the pipeline can be executed via SIMD operations and/or via data exchange among the modules with high-bandwidth wired and/or wireless interconnect.

In some embodiments, to execute efficiently task-level parallelism (such as for multiple applications) each processor on each memory module can simply move from context to context cached in memory; and thus, each processor can continuously run bytecode of applications in a logical and shared space. In this sense, an OS of a device and running applications can be merged together representing a global shared context (e.g., see global share context 101). The value of that shared context is when it is placed in memory, especially non-volatile memory, it continuously evolves and persist there according to the user using the device or a system that includes memory modules.

In some embodiments, a system can include a plurality of memory modules, and each memory module of the plurality of memory modules can be configured to execute a program code distributed between the plurality of memory modules and associated with at least one program. In such examples, each memory module of the plurality of memory modules can include a plurality of physical memory partitions, and each partition of the plurality of physical memory partitions can be associated with at least one physical memory address. And, in such examples, each memory module of the plurality of memory modules can include at least one processor, and each processor of the system can be associated with at least one physical memory partition of the plurality of physical memory partitions.

In such embodiments and others, each processor of the system can be configured to execute code at least partly according to a locality of virtual memory accesses to the plurality of physical memory partitions as well as access physical memory of the system based on virtual memory addresses associated with memory accesses coded in the code. And, each processor of the system can be configured to map each one of the virtual memory addresses to a shared memory address associated with physical memory of the plurality of memory modules and shared between the plurality of memory modules.

In some embodiments, if a program code has a copy at each processor of each memory module, and if the code is requesting to access physical memory of one memory partition associated with a first processor at some time then that processor can run that part of code. If after some time the program code is requesting to access physical memory of another memory partition associated with another processor then the first processor can communicate to another processor the program counter and relevant data so that the second processor continues execution according to the locality of virtual memory accesses to the plurality of physical memory partitions. In some embodiments, instead of a first processor a first group of processors can be used and instead of another processor another group of processors can be used. And, the first group and another group can overlap.

Also, in such embodiments and others, each processor of the system can be configured to receive shared memory addresses and data associated with the received shared memory addresses from other processors and memory modules of the system, and map the received shared memory addresses to respective physical memory addresses of physical memory partitions of the system associated with the processor. Further, each processor of the system can be configured to send shared memory addresses and data associated with the sent shared memory addresses to other processors of the system based at least in part on mapping of the sent shared memory addresses to respective physical memory addresses of the system. In such examples, at least one memory module of the plurality of memory modules can include a part of a graphics processing pipeline distributed between the plurality of memory modules.

Also, at least some embodiments disclosed herein include a system having a plurality of such memory modules. More specifically, at least some embodiments disclosed herein include a memory module having a plurality of memory chips, at least one controller (e.g., a CPU or special-purpose controller), and at least one interface device configured to communicate input and output data for the memory module. The input and output data bypasses at least one processor (e.g., a CPU) of a computing device in which the memory module is installed. And, the at least one interface device can be configured to communicate the input and output data to at least one other memory module in the computing device. Also, the memory module can be one module in a plurality of memory modules of a memory module system. In some embodiments, a memory module system can be designed such that when adding memory modules to a system it is increasing the size of one memory module by adding more memory partitions, processors associated with partitions and increasing bandwidth of memory bus.

In some embodiments, the memory module can be or include a DIMM, a SO-DIMM, a registered DIMM (RDIMM), a mini-RDIMM, a socketed memory stack, or a socketed system on package or another type of package on package (PoP) for memory. And, in some embodiments, the memory module can be configured to include a special purpose chip, such as a GPU, an artificial intelligence (AI) accelerator, and/or a processing-in-memory (PIM) unit. Also, in some embodiments, the memory module is capable of outputting results to a peripheral device (e.g., a display or another type of user interface) through a wired connection, a wireless connection, or a combination thereof without going through a memory bus between a processor and the memory module. For example, in some embodiments, the memory module is capable of outputting results to a peripheral device through a wired connection or wireless connection without going through a memory bus between the memory module and the main processor of a computing device hosting the memory module. Such a memory module and other memory modules disclosed herein can accelerate processing of a graphics pipeline (e.g., data processing for geometry, projection, lighting, clipping, rasterization, shading, screen streaming, etc.). Also, a system having a plurality of such memory modules communicating with each other can further accelerate processing of a graphics pipeline.

FIG. 2 shows a memory module 202 that is somewhat similar to memory module 102a or 102b. Also, FIG. 2 shows the memory module 202 having a plurality of memory chips (e.g., see memory chips 204a, 204b, and 204c). Each chip of the memory chips in the module 202 includes a plurality of physical memory partitions (e.g., see partitions 205a to 205i). The memory module 202 also has at least one processor (e.g., see processors 206a and 206b) that can at least in part implement the global shared context 101. Also, at least some partitions in the memory module 202 (as well as partitions in the memory modules 102a and 102b in FIG.

1) can in part implement the global shared context 101 (e.g., see partitions 205a to 205c and partition 205e). As shown, different embodiments of the memory module 202 can have one processor (e.g., processor 206a), two processors (e.g., processors 206a and 206b), or more than two processors. It is to be understood that the dashed-lined boxes represent optional components. Also, it is to be understood that an embodiment of the memory module 202 can have two memory chips or more than two memory chips.

Memory described herein, such as memory of the memory modules, can include various types of memory. For example, such memory can include flash memory having flash memory cells. Also, for example, such memory can include dynamic random-access memory (DRAM) including DRAM cells. Also, for example, such memory can also include non-volatile random-access memory (NVRAM) including NVRAM cells. The NVRAM cells can include 3D XPoint memory cells. Also, the DRAM cells can be typical DRAM cells of varying types of typical DRAM cells, such as cells having ferroelectric elements. Also, cells can include ferroelectric transistor random-access memory (FeTRAM) cells. The memory cells can also have at least one of a transistor, a diode, a ferroelectric capacitor, or a combination thereof.

The memory module 202 is also shown having at least one interface device (e.g., see interface devices 208a and 208b). As shown, different embodiments of the memory module 202 can have one interface device (e.g., interface device 208a), two interface devices (e.g., interface devices 208a and 208b), or more than two interface devices. And, as mentioned, it is to be understood that the dashed-lined boxes represent optional components. The at least one interface device (e.g., see interface devices 208a and 208b) can be configured to communicate input and output data, including data related to the global shared context, for the memory module 202. The input and output data can bypass a processor (e.g., the main processor) of a system in which the memory module 202 is installed (e.g., see interface devices 208a and 208b being connected to other devices 214 of a system in which the memory module 202 is installed and bypassing one or more processors 212 of the system in which the memory module is installed, via connections 218a and 218b). In some embodiments, as shown in FIG. 2, the input and output data bypasses a data bus (such as the main data bus) of the system in which the memory module 202 is installed (e.g., see interface devices 208a and 208b being connected to other devices 214 of the system in which the memory module is installed and bypassing one or more busses 216 of the system in which the memory module is installed, via connections 218a and 218b). It is to be understood that the dashed-lined connections represent optional connections.

The memory module 202 is also shown having a bus 210 (which can include multiple busses) that connects the plurality of memory chips (e.g., see memory chips 204a, 204b, and 204c), the processor(s) (e.g., see processors 206a and 206b), and the interface device(s) (e.g., see interface devices 208a and 208b). The bus 210 can be a part of a bus of the system in which the memory module is installed (e.g., see one or more busses 216), which connects the memory module 202 to the rest of the system in which it is installed. As shown by the dashed-lined portion of the bus 210 that connects the memory module to the one or more busses 216 and the rest of the system, bus 210 may be separate from one or more busses 216 in some embodiments and in other embodiments it may be connected to the one or more busses 216. It is to be understood that the dashed-lined connections represent optional connections. One or more of the processors of the memory module 202 (e.g., see processors 206a and 206b) can arbitrate data communicated over bus 210, including data related to the global shared context, and connections that bypass the one or more busses 216 (e.g., see connections 218a and 218b).

The interface devices and other interface devices mentioned herein can include one or more network interface devices, one or more links, one or more buses, one or more ports, one or more peer-to-peer links, or any combination thereof.

In some embodiments, the memory module 202 can implement a global shared context (e.g., see global share context 101). In general, a global shared context includes a plurality of instances of the memory module(s) 102a, 102b, and/or 202 communicating with each other via their interface devices. The global shared context can be beneficial for graphics processing and graphics applications including processing using SIMD concepts or vector processing concepts since large amounts of memory is useful and data processing proximate to memory can improve graphics processing. In such embodiments and others, the interface device(s) (e.g., see interface devices 208a and 208b) can be configured to communicate the input and output data to at least one other instance of the memory module installed in the system in which the communicating memory module is installed.

In some embodiments, the memory module 202 or another memory module described herein, the processor 206a or another processor or controller described herein, the interface device 208a or another interface device described herein, the memory chips 204a, 204b, and 204c or other memory chips described herein, or any combination thereof can be a part of a SoC, system on package (SoP) such as an interposed chiplet system, or a heterogeneous die stack or alike. All of these embodiments represent tightly integrated IP blocks and chips not necessarily including a PCB for coupling with each other and the rest of the system. Embodiments including or being a part of an SoC or other embodiments can include one or more GPUs or one or more other types of specialty processors and/or one or more PIM units. Embodiments including or being a part of an SoC or other embodiments can include processors that can include or are connected to a memory controller, a display sink (e.g. HDMI, DisplayPort or a wireless display interface), a radio for a wireless interface or network, an AI engine or accelerator, neuromorphic processor, scaler-type processors, vector-type processors, CPU cores, and the like. In such cases the global shared context provides a framework for applications to use these devices in an integrated and shared manner.

Not shown in FIG. 2, the memory module 202 can also include a plurality of electrical contacts. The memory module 202 can also include a PCB configured for insertion into at least one memory slot of a motherboard. In such embodiments, the plurality of memory chips (e.g., see memory chips 204a, 204b, and 204c) can be coupled to the PCB, and the plurality of electrical contacts can be on each side of the PCB. Also, the processor(s) (e.g., see processors 206a and 206b) can be coupled to the PCB, and the interface device(s) (e.g., see interface devices 208a and 208b) can be coupled to the PCB.

In some embodiments, the processor(s) (e.g., see processors 206a and 206b) can be, include, or be a part of at least one special-purpose controller. The special-purpose processor(s) or controller(s) can be, include, or be a part of a GPU, an AI accelerator, a NPU, another type of special-purpose controller, a PIM unit, or any combination thereof. Such devices can take advantage of the global shared context to be unified and can provide acceleration of large-scale applications such as neural networks, big data applications, machine learning and more via the global shared context.

In some embodiments, the interface device(s) (e.g., see interface devices 208a and 208b) can include at least one wireless interface device that communicates at least in part wirelessly or can include intra-chip optical interconnect that provides optical communication between chips. Another part of the interface device(s) can communicate via a wire. An interface device can also be a hybrid interface device with multiple capabilities and/or channels and channel types. The interface device(s) can be, include, or be a part of a network interface device (such as a wireless network interface device). The interface device(s) can include at least one wireless interface device and/or wired links can be configured to communicate over one or more wired and/or wireless networks, peer-to-peer links, ports, buses, etc. Thus, messages and data that is being exchanged related to the global shared context can use such interfaces.

In some embodiments, the memory module 202 can include first connections configured to connect the plurality of memory chips (e.g., memory chips 204a, 204b, and 204c) to at least some of the plurality of electrical contacts to communicate input and output data of the plurality of memory chips to a processor of a computing device in which the memory module 202 is installed (such as the main processor of the computing device). The memory module 202 can also include second connections configured to connect the plurality of memory chips to the processor(s) (e.g., see processors 206a and 206b). The memory module 202 can also include one or more third connections configured to connect the processor(s) to the interface device(s) (e.g., see interface devices 208a and 208b) so that the interface device(s) receive input data for the processor(s) from other devices and communicates output data of the processor(s) to other devices via a communications path that bypasses a processor of the computing device in which the memory module 202 is installed. Such connections can be used with the global shared context.

In some embodiments, a wireless communication can occur among multiple memory modules installed in the system. For example, a wireless receiver can allow for data communications between aligned-in-space modules in close proximity (like DIMMs installed in a PC board). This can increase speeds of such communications. Specifically, in some embodiments, Terahertz Wireless Communication (THz) can provide speeds of 100s Gb/sec. Thus, in such examples, intra-chip or intra-module THz radiation can support large volume of data exchange between memory modules disclosed herein, which can be used to implement at least partially page table operations and other data exchange for the global shared context.

FIG. 3 illustrates example memory module system 300, in accordance with some embodiments of the present disclosure. The memory module system 300 can include, be a part of, or be the memory module system 100 that can implement at least partially the global shared context. Depicted in FIG. 3, memory module system 300 includes a plurality of memory modules (e.g. see memory modules 302a, 302b, and 302c). And, each of the memory modules can include a plurality of memory chips (although not depicted in FIG. 3). Each memory module of the plurality of memory modules (e.g. see memory modules 302a, 302b, and 302c) can be the memory module 102a, 102b, or 202. The memory module system 300 can include at least one external controller (e.g., see external controllers 306a and 306b) and at least one interface device (e.g., see interface devices 308a and 308b). The memory module system 300 is shown having a bus 310 (which can include multiple busses) that connects the plurality of memory modules (e.g., see memory modules 302a, 302b, and 302c), the external controller(s) (e.g., see external controllers 306a and 306b), and the interface device(s) (e.g., see interface devices 308a and 308b).

As shown, different embodiments of the memory module system 300 can have one interface device (e.g., interface device 308a), two interface devices (e.g., interface devices 308a and 308b), or more than two interface devices. And, as mentioned, it is to be understood that the dashed-lined boxes represent optional components. Interface device (e.g., see interface devices 308a and 308b) can be configured to communicate input and output data for each of the memory module system 300. The input and output data can bypass a processor (e.g., the main processor) of a respective system in which one of the memory module system 300 is installed (e.g., see interface devices 308a and 308b being connected to other devices 314 of a system in which the memory module system 300 is installed and bypassing one or more processors 312 of the host system, via connections 318a and 318b). The input and output data can be related to data used by applications via the global shared context.

In some embodiments, as shown in FIG. 3, the input and output data bypasses a data bus (such as the main data bus) of the host system in which one of the memory module system 300 is installed (e.g., see interface devices 308a and 308b being connected to other devices 314 of the system and bypassing a bus 316 of the system (which can have multiple buses), via connections 318a and 318b). It is to be understood that the dashed-lined connections represent optional connections. The global shared context can take advantage of bus bypassing and speedup some critical operations.

Also, the bus 310 can be a part of a bus of the host system in which the memory module system 300 is installed (e.g., see bus 316), which connects the memory module system 300 to the rest of the host system in which it is installed. As shown by the dashed-lined portion of the bus 310 that connects the memory module system to the bus 316 and the rest of the system, the bus 310 may be separate from bus 316 in some embodiments and in other embodiments it may be connected to the bus 316. It is to be understood that the dashed-lined connections represent optional connections. One or more of the external controllers of the memory module system 300 (e.g., see controllers 306a and 306b) can arbitrate data communicated over bus 310 and connections that bypass the bus 316 (e.g., see connections 318a and 318b). The data can include data for implementing at least part of the global shared context such as data used and processed by processors exchanging messages and making memory accesses to memory partitions.

As shown, the external controller(s) (e.g., see external controllers 306a and 306b) is separate from the plurality of memory modules (e.g. see memory modules 302a, 302b, and 302c) in the memory module system 300. In some embodiments of the memory module system 300, the at least one external controller can be configured to coordinate computations by the controllers or processors of the plurality of memory modules (e.g., see the processors 106a and 106b and the memory modules 102a, 102b, 202, and 302a to 302c). These computations can be related to computations performed by processors as a part of the global shared context. Also, the external controller(s) can be configured to coordinate communications by the interface devices of the plurality of memory modules (e.g., see interface devices 208a and 208b and the memory modules 102a, 102b, 202, and 302a to 302c).

Also, as shown, an interface device (e.g., see interface devices 308a and 308b) can be separate from the plurality of memory modules (e.g. see memory modules 302a, 302b, and 302c) in the memory module system 300. The interface devices of the memory module system 300 is shown (e.g., see interface devices 308a and 308b) each can include a wireless interface device that communicates at least in part wirelessly or can include intra-chip optical interconnect that provides optical communication between chips. Another part of the interface devices of the memory module system 300 can communicate via wires. The interface devices of the memory module system 300 can also be a hybrid interface device with multiple capabilities and/or channels and channel types. The interface devices of the memory module system 300 can be, include, or be a part of a network interface device (such as a wireless network interface device). The interface devices of the memory module system 300 can include a wireless interface device and/or wired links can be configured to communicate over one or more wired and/or wireless networks, peer-to-peer links, ports, buses, etc. Such interface devices can provide enhanced connections (such as faster connections) for implementing the global shared context.

Also, the plurality of memory modules (e.g. see memory modules 302a, 302b, and 302c) can be a plurality of different types of memory structures. For example, the plurality of memory modules can be, be a part of, or include one or more DIMMs, one or more SO-DIMMs, one or more RDIMMs, one or more mini-RDIMMs, one or more socketed memory stacks, one or more socketed systems on package or another type of PoP for memory, one or more of a different type of memory structure or module, or any combination thereof. Such modules can be integrated into a system using the global shared context.

Also, each memory module described herein can be a different type of memory structure. For example, a memory module described herein can be, be a part of, or include a DIMM, a SO-DIMM, a RDIMM, a mini-RDIMM, a socketed memory stack, or a socketed system on package or another type of PoP for memory.

For example, in some embodiments of the memory module system 300, the system can include a plurality of DIMMs. And, each DIMM of the plurality of DIMMs can include a PCB configured for insertion into a memory slot of an additional PCB that is separate from the plurality of DIMMs. Also, each DIMM of the plurality of DIMMs can include a plurality of memory chips coupled to the PCB, a plurality of electrical contacts on each side of the PCB, at least one controller (such as at least one special-purpose controller) coupled to the PCB, and at least one interface device configured to communicate input and output data for the DIMM. The input and output data bypasses a processor of a computing device in which the DIMM and the system is installed. And, in such embodiments of system 300 having DIMMS, the at least one interface device can be configured to communicate the input and output data to at least one other DIMM of the plurality of DIMMs. Such data may be a part of the global shared context.

Also, in such embodiments of system 300 having DIMMS, the at least one external controller is separate from the plurality of DIMMs and can be configured to coordinate computations by the special-purpose controllers of the plurality of DIMMs. The at least one external controller can also be configured to coordinate communications by the interface devices of the plurality of DIMMs. And, in such embodiments, the additional PCB is separate from the plurality of DIMMs and can include a plurality of memory slots configured to receive the plurality of DIMMs. Also, the external controller(s) can be coupled to the additional PCB, and the additional PCB can be a motherboard and the external controller(s) can include a CPU or another type of processor such as a special-purpose controller. Such plurality of DIMMs can run at least part of the global shared context.

In some embodiments, the at least one controller of each DIMM of the plurality of DIMMs can be a special-purpose controller. For example, a controller can be, be a part of, or include a GPU, an AI accelerator, an NPU, of another type of special-purpose controller, a PIM unit, or any combination thereof. It is to be understood that the aforesaid devices and other parts described with respect to FIGS. 1 to 3 can use the global shared context to unify such devices and parts and provide acceleration of large-scale applications such as neural networks, big data applications, machine learning, etc.

Figure 4:
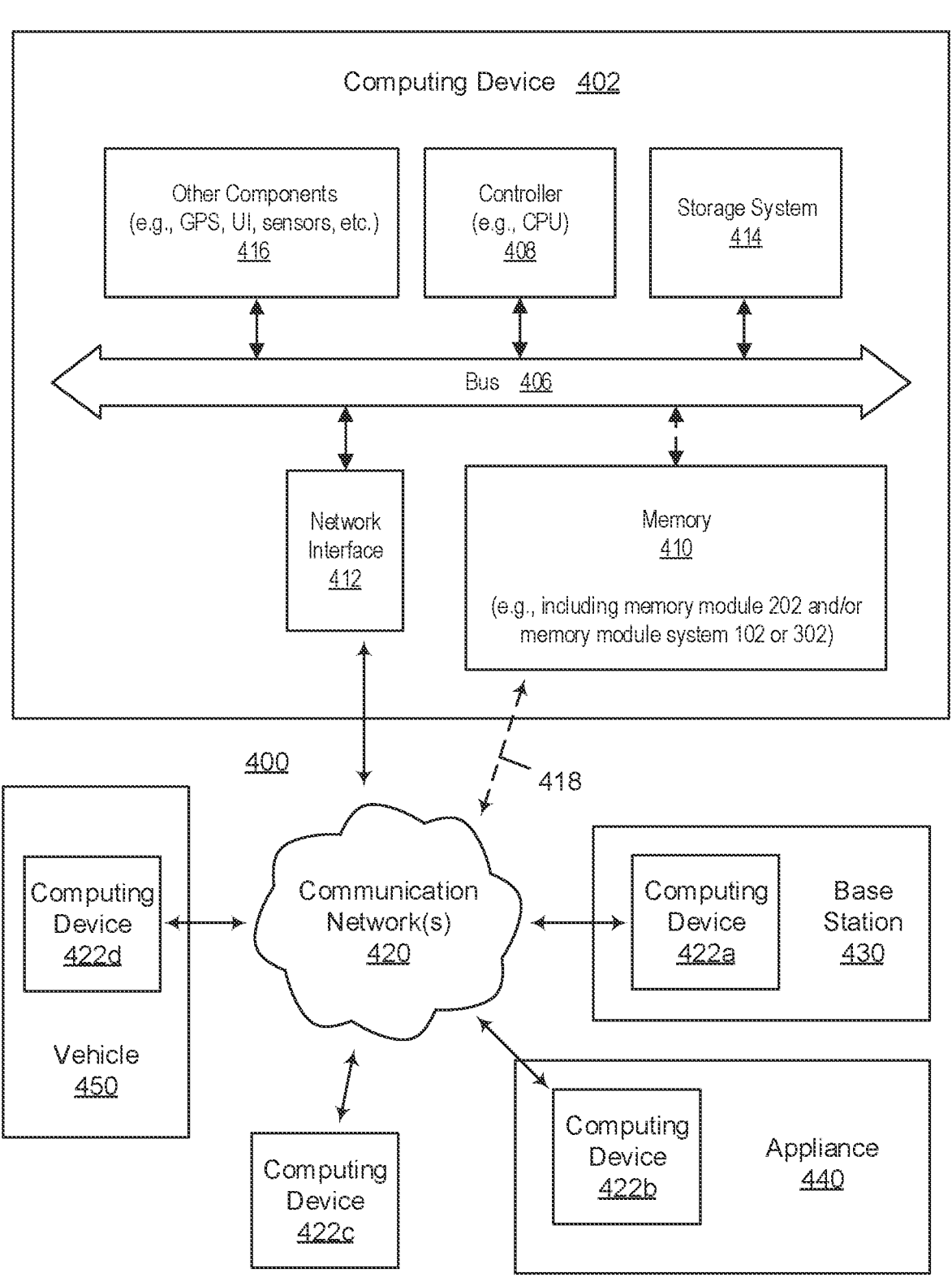
FIG. 4 illustrates an example networked system that includes computing devices, in accordance with some embodiments of the present disclosure.

FIG. 4 illustrates the example networked system 400 that includes at least computing devices 402, 422a, 422b, 422c, and 422d, in accordance with some embodiments of the present disclosure. Also, FIG. 4 illustrates example parts of an example computing device 402 with is part of the networked system 400. And, FIG. 4 shows how such computing devices can be integrated into various machines, apparatuses, and systems, such as IoT devices, mobile devices, communication network devices and apparatuses (e.g., see base station 430), appliances (e.g., see appliance 440), and vehicles (e.g., see vehicle 450). It is to be understood that the parts and devices described with respect to FIG. 4 can use the global shared context to unify such devices and parts and provide acceleration of large-scale applications such as neural networks, big data applications, and machine learning used between the devices and parts.

The computing device 402 and other computing devices of the networked system 400 (e.g., see computing devices 422a, 422b, 422c, and 422d) can be communicatively coupled to one or more communication networks 420. The computing device 402 includes at least a bus 406, a controller 408 (such as a CPU), memory 410, a network interface 412, a data storage system 414, and other components 416 (which can be any type of components found in mobile or computing devices such as GPS components, I/O components such various types of user interface components, and sensors as well as a camera). The memory 410 can include memory modules 102a, 102b, and/or 202 and/or memory module systems 100 and/or 300. The other components 416 can include one or more user interfaces (e.g., GUIs, auditory user interfaces, tactile user interfaces, etc.), displays, different types of sensors, tactile, audio and/or visual input/output devices, additional application-specific memory, one or more additional controllers (e.g., GPU), or any combination thereof. The bus 406 communicatively couples the controller 408, the memory 410, the network interface 412, the data storage system 414 and the other components 416, and can couple such components to the second memory 412 in some embodiments.

The computing device 402 includes a computer system that includes at least controller 408, memory 410 (e.g., read-only memory (ROM), flash memory, dynamic random-access memory (DRAM) such as synchronous DRAM (SDRAM) or Rambus DRAM (RDRAM), static random-access memory (SRAM), cross-point or cross-bar memory, crossbar memory, etc.), and data storage system 414, which can communicate with each other via bus 406 (which can include multiple buses). In some embodiments, the second memory 418 may not communicate over bus 406.

To put it another way, FIG. 4 includes a block diagram of computing device 402 that has a computer system in which embodiments of the present disclosure can operate. In some embodiments, the computer system can include a set of instructions, for causing a machine to perform at least part any one or more of the methodologies discussed herein, when executed. In such embodiments, the machine can be connected (e.g., networked via network interface 412) to other machines in a LAN, an intranet, an extranet, and/or the Internet (e.g., see network(s) 420). The machine can operate in the capacity of a server or a client machine in client-server network environment, as a peer machine in a peer-to-peer (or distributed) network environment, or as a server or a client machine in a cloud computing infrastructure or environment.

Controller 408 represents one or more general-purpose processing devices such as a microprocessor, a CPU, or the like. More particularly, the processing device can be a complex instruction set computing (CISC) microprocessor, reduced instruction set computing (RISC) microprocessor, very long instruction word (VLIW) microprocessor, single instruction multiple data (SIMD), multiple instructions multiple data (MIMD), or a processor implementing other instruction sets, or processors implementing a combination of instruction sets. Controller 408 can also be one or more special-purpose processing devices such as an ASIC, a programmable logic such as an FPGA, a digital signal processor (DSP), network processor, or the like. Controller 408 is configured to execute instructions for performing the operations and steps discussed herein. Controller 408 can further include a network interface device such as network interface 412 to communicate over one or more communication networks (such as network(s) 420).

The data storage system 414 can include a machine-readable storage medium (also known as a computer-readable medium) on which is stored one or more sets of instructions or software embodying any one or more of the methodologies or functions described herein. The data storage system 414 can have execution capabilities such as it can at least partly execute instructions residing in the data storage system. The instructions can also reside, completely or at least partially, within at least one of the memory 410 and/or within the controller 408 during execution thereof by the computer system, at least one of the memory 410 and the controller 408 also constituting machine-readable storage media. The memory 410 can be or include main memory of the computing device 402. The memory 410 can have execution capabilities such as it can at least partly execute instructions residing in the memory.

As mentioned, the networked system 400 includes computing devices, and each of the computing devices can include one or more buses, a controller, a memory, a network interface, a storage system, and other components. Also, each of the computing devices shown in FIG. 4 and described herein can include or be a part of a mobile device or the like, e.g., a smartphone, tablet computer, IoT device, smart television, smart watch, glasses or other smart household appliance, in-vehicle information system, wearable smart device, game console, PC, digital camera, or any combination thereof. As shown, the computing devices can be connected to network(s) 420 that includes at least a local to device network such as Bluetooth or the like, a wide area network (WAN), a local area network (LAN), an intranet, a mobile wireless network such as 4G or 5G, an extranet, the Internet, and/or any combination thereof. In some embodiments, as shown with the dashed connection 418, the memory 410 can include at least one network interface so that it can communicate separately with other devices via communication network(s) 420. For example, a memory module or a memory module system of the memory 410 (e.g., see memory modules 102*a*, 102*b* and 202, and memory module systems 100 and 300) can have its own network interface so that such a component can communicate separately with other devices via communication network(s) 420.

Each of the computing devices described herein can be or be replaced by a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine.

Also, while a single machine is illustrated for the computing device 402 shown in FIG. 4, the term "machine" shall also be taken to include any collection of machines that individually or jointly execute a set (or multiple sets) of instructions to perform one or more of the methodologies or operations discussed herein. And, each of the illustrated computing devices as well as computing systems can each include at least a bus and/or motherboard, one or more controllers (such as one or more CPUs), a main memory that can include temporary data storage, at least one type of network interface, a storage system that can include permanent data storage, and/or any combination thereof. In some multi-device embodiments, one device can complete some parts of the methods described herein, then send the result of completion over a network to another device such that another device can continue with other steps of the methods described herein.

While the memory, controller, and data storage parts are shown in the example embodiment to each be a single part, each part should be taken to include a single part or multiple parts that can store the instructions and perform their respective operations. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

FIGS. 5 to 7 illustrate flow diagrams of example methods 500, 600, and 700 that can be performed by aspects of memory modules depicted in FIGS. 1 to 4, in accordance with some embodiments of the present disclosure. For example, each one of the methods 500, 600, and 700 can be performed by a processor of a memory module disclosed herein.

In FIG. 5, the method 500 begins at step 502 with activating, amongst at least one memory module, a global context used by at least one program (e.g., see global share context 101 shown in FIGS. 1 and 2). The at least one memory module can include a plurality of physical memory partitions (e.g. see partitions 104*a* to 104*c*, partitions 104*d* to 104*f*, and partitions 205*a* to 205*i* shown in FIGS. 1 and 2 respectively), and each partition of the plurality of physical memory partitions can be associated with at least one physical memory address. The at least one memory module can also include at least one processor (e.g., see processors 106*a* to 106, 106*c* to 106*d*, and 206*a* to 206*b*), and the at least one processor can be associated with at least one physical memory partition of the plurality of physical memory partitions.

In such embodiments and others, the at least one processor can be configured to execute the code and access physical memory of a system of memory modules having the at least one memory module based on the virtual memory addresses associated with the memory accesses coded in the code. The at least one processor can be configured to translate and map each one of the virtual memory addresses to a shared memory address associated with physical memory of the system of memory modules and shared amongst memory modules of the system of memory modules. The at least one processor can be configured to receive shared memory addresses and data associated with the received shared memory addresses from other processors and memory modules of the system of memory modules. The at least one processor can be configured to translate and map the received shared memory addresses to respective physical memory addresses of physical memory partitions of the system of memory modules associated with the at least one processor. And, the at least one processor can be configured to send shared memory addresses and data associated with the sent shared memory addresses to other processors of the system based at least in part on a determination of mapping of the sent shared memory addresses to respective physical memory addresses of the system.

At step 504, the method 500 continues with distributing, amongst the at least one memory module, code of the at least one program according to the activated global context. The global context (e.g., see global shared context 101) can be used by an operating system of a device executing the at least one program, and the global context can be modified according to at least user interactions with the device. In some embodiments, the method 500 can include distributing, amongst the at least one memory module, at least one part of a graphics processing pipeline.

At step 506, the method 500 continues with executing, at least partially, each part of the code according to a locality of virtual memory accesses of program code to the at least one memory module. At step 508, the method 500 continues with accessing physical memory of the at least one memory module based on virtual memory addresses associated with memory accesses coded in the code.

In FIG. 6, the method 600 begins at step 602 with executing code and accessing physical memory of a system of memory modules based on virtual memory addresses of the system associated with memory accesses coded in code of computer programs, by a processor of a memory module of the system. At step 604, the method 600 continues with mapping, by the processor of the memory module, each one of the virtual memory addresses to a shared memory address associated with physical memory of the memory modules of the system and shared amongst the memory modules of the system. At step 606, the method 600 continues with receiving, by the processor of the memory module, shared memory addresses and data associated with the received shared memory addresses from other processors and memory modules of the system.

At step 608, the method 600 continues with mapping, by the processor of the memory module, the received shared memory addresses to respective physical memory addresses of physical memory partitions of the system associated with the processor. At step 610, the method 600 continues with sending, by the processor of the memory module, shared memory addresses and data associated with the sent shared memory addresses to other processors of the system based at least in part on mapping of the sent shared memory addresses to respective physical memory addresses of the system.

In FIG. 7, the method 700 begins at step 702 with distributing, amongst memory modules of a system of memory modules, a global context used by computer programs. Step 702 can include step 704 where the method 700 continues with receiving, by a memory module of the system, shared memory addresses from other memory modules of the system. Step 702 can also include step 706 where the method 700 continues with sending, by a memory module of the system, shared memory addresses to other memory modules of the system.

At step 708, the method 700 continues with mapping, according to the global context, virtual memory addresses (associated with memory accesses coded in code of the programs) to a shared memory address associated with physical memory of the system and shared amongst the memory modules.

At step 710, the method 700 continues with distributing, amongst the at least one memory module, the code of the at least one program according to the distributed global context (such as via the mapping). Step 710 can include step 712 where the method 700 continues with receiving, by a memory module of the system, data associated with received shared memory addresses from other memory modules of the system. Step 710 can include step 714 where the method 700 continues with sending, by a memory module of the system, data associated with sent shared memory addresses to other memory modules of the system.

At step 716, the method 700 continues with executing, at least partially, each part of the code according to a locality of virtual memory accesses of program code to the memory modules of the system. At step 718, the method 700 continues with accessing physical memory of the memory modules based on the virtual memory addresses associated with memory accesses coded in the code.

In some embodiments, it is to be understood that the steps of methods 500, 600, and 700 can be implemented as a continuous process such as each step can run independently by monitoring input data, performing operations and outputting data to the subsequent step. Also, such steps for each method can be implemented as discrete-event processes such as each step can be triggered on the events it is supposed to trigger and produce a certain output. It is to be also understood that each figure of FIGS. 5 to 7 represents a minimal method within a possibly larger method of a computer system more complex than the ones presented partly in FIGS. 1 to 4. Thus, the steps depicted in each figure of FIGS. 5 to 7 can be combined with other steps feeding in from and out to other steps associated with a larger method of a more complex system.

Figure 9:
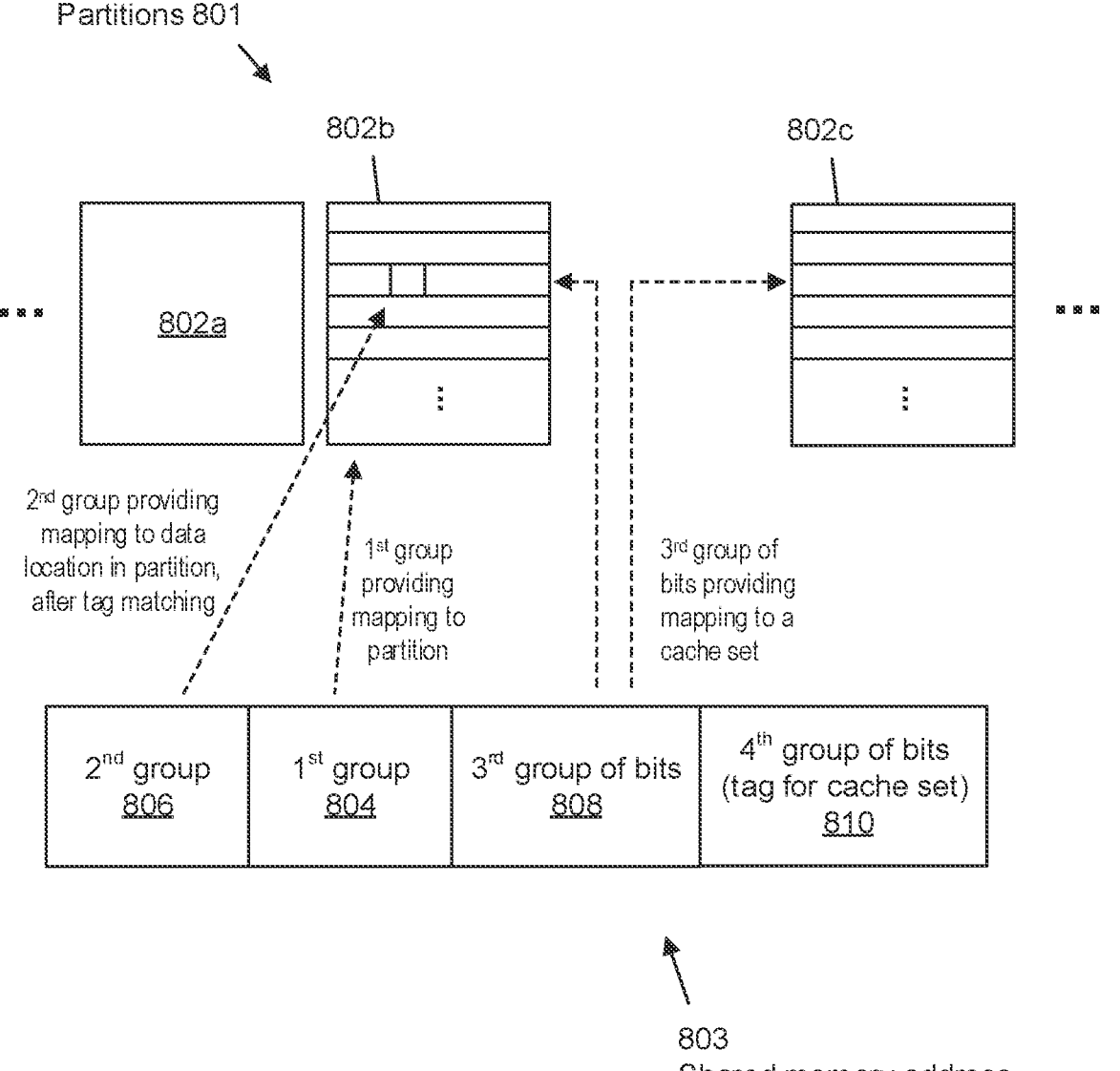

FIGS. 8 to 9 illustrate example physical memory partitions (e.g., see partitions 801 which include partitions 802*a*, 802*b*, 802*c*, and 802*d*) and groups of bits of a shared memory address (e.g., see shared memory address 803) that map to at least one partition and at least one data location in the partition, in accordance with some embodiments of the present disclosure. More specifically, predetermined bits of the shared memory address 803 include two or more groups of bits (e.g., see first and second groups of bits 804 and 806). The first group of bits 804 can provide mapping to a physical memory partition of the plurality of physical memory partitions of the plurality of memory modules described herein (e.g., see partition 802*b* which is mapped to by the first group of bits 804). The second group of bits 806 can provide mapping to a data location within the physical memory partition (e.g., see partition 802*b* which includes a data location mapped to by the second group of bits 806).

Specifically, in FIG. 9, the predetermined bits of the shared memory address 803 include four groups of bits. The third group of bits 808 can provide mapping to a cache set that includes one or more physical memory partitions of the plurality of physical memory partitions of the plurality of memory modules described herein (e.g., see the third group of bits 808 providing mapping to a cache set associated with at least partitions 802*b* and 802*c*). The cache set can be distributed across multiple partitions at certain memory locations (such as at certain arrays, banks, ranks, rows, or columns). And, values of the fourth group of bits 810 can at least in part provide tag information for respective cache sets. The tag information in the fourth group of bits 810 can provide a tag used for determining if a page or cache line is present in the cache. Tag matching hardware can perform a lookup of a tag and if it finds the tag then the data (e.g., data in a page or a cache line) is presented or cached in the cache. If it is not in the cache, the data may need to be accessed in a backing store. The tag match hardware may comprise a plurality of comparators or lookup tables (LUTs), or include specialized memory elements which may provide a match function. The second group of bits 806 can provide mapping to a data location in a partition, and more specifically within a cache set, after tag matching (such as tag matching through the tag information provided by the fourth group of bits 810).

With respect to the predetermined bits of shared memory addresses described herein, the groups of bits of the predetermined bits can be arranged in a sequence or not in a sequence and the groups may or may not be adjoining.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. Such a computer program can be stored in a computer readable storage medium, such as any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system, comprising:
a plurality of memory modules inter-connected to provide a physical memory, each respective memory module of the plurality of memory modules comprising a plurality of partitions of the physical memory, wherein a partition of the plurality of partitions is associated with at least one physical memory address;
a plurality of processors, wherein each processor of the plurality of processors is associated with the respective memory module of the plurality of memory modules; and
at least one processor of the plurality of processors configured to:
execute code, wherein execution of the code causes the at least one processor to access a virtual memory address, wherein only a single processor of the plurality of processors is configured to initially execute the code;
map the virtual memory address to a shared memory address in a logical memory space shared between the plurality of processors in the plurality of memory modules;
map the shared memory address to a physical memory address of the partition of the plurality of partitions; and
send, based on the physical memory address and after the initial execution of the code by the single processor, to another processor of the plurality of processors that is associated with the physical memory address, data for continuing to execute a program code at least partially executed by the at least one processor.

2. The system of claim 1, wherein mapping of the virtual memory address to the shared memory address is based on page tables, wherein an entry in the page tables maps the virtual memory address to the shared memory address.

3. The system of claim 2, wherein the page tables are readable and modifiable by the at least one processor.

4. The system of claim 2, wherein the page tables are stored in the plurality of partitions.

5. The system of claim 2, wherein each of the respective memory module of the plurality of memory modules maintains a respective part of the page tables, and wherein the respective part of the page tables, of the respective memory module, provides mapping for physical memory addresses of the respective memory module.

6. The system of claim 5, wherein modifications to the page tables occur via a modifying device communicating messages to the plurality of memory modules, and wherein at least one of the memory modules is configured to send a confirmation to the modifying device that a communicated message has been received and a respective modification has been entered.

7. The system of claim 2, wherein one or more of the respective memory modules of the plurality of memory modules maintains page tables for itself and other memory modules of the system, wherein modifications to the page tables occur via a modifying device broadcasting messages to the plurality of memory modules, and wherein one or more of the plurality of memory modules perform the modifications to the page tables on its copy of the page tables.

8. A method comprising:
executing, by a processor in a memory module among a plurality of memory modules inter-connected to provide a physical memory, code to cause the processor to access a virtual memory address, wherein each of the plurality of memory modules has one or more processors;
mapping, by the processor, the virtual memory address to a shared memory address in a logical memory space shared between processors in the plurality of memory modules inter-connected to provide the physical memory, the memory module of the plurality of memory modules comprising a plurality of partitions of the physical memory, wherein a partition of the plurality of partitions is associated with at least one physical memory address;
mapping, by the processor, the shared memory address to a physical memory address of the partition of the plurality of partitions; and
sending, by the processor based on the physical memory address and after executing the code by the processor, to another processor of the processors that is associated with the physical memory address, data for continuing to execute a program code at least partially executed by the processor.

9. The method of claim 8, wherein mapping of the virtual memory address to the shared memory address is based on page tables, wherein an entry in the page tables maps the virtual memory address to the shared memory address.

10. The method of claim 9, wherein the page tables are readable and modifiable by the processor.

11. The method of claim 9, wherein the page tables are stored in the plurality of partitions.

12. The method of claim 9, wherein each of the respective memory module of the plurality of memory modules maintains a respective part of the page tables, and wherein the respective part of the page tables, of the respective memory module, provides mapping for physical memory addresses of the respective memory module.

13. The method of claim 12, wherein modifications to the page tables occur via a modifying device communicating messages to the plurality of memory modules, and wherein at least one of the memory modules is configured to send a confirmation to the modifying device that a communicated message has been received and a respective modification has been entered.

14. The method of claim 9, wherein one or more of the respective memory modules of the plurality of memory modules maintains page tables for itself and other memory modules, wherein modifications to the page tables occur via a modifying device broadcasting messages to the plurality of memory modules, and wherein one or more of the plurality of memory modules perform the modifications to the page tables on its copy of the page tables.

15. A non-transitory computer-readable storage medium for tangibly storing computer program instructions which when executed by a processor, cause the processor to perform a method, comprising:

executing, by the processor in a memory module among a plurality of memory modules inter-connected to provide a physical memory, code to cause the processor to access a virtual memory address, wherein each of the plurality of memory modules has one or more processors;

mapping, by the processor, the virtual memory address to a shared memory address in a logical memory space shared between processors in the plurality of memory modules inter-connected to provide the physical memory, the memory module of the plurality of memory modules comprising a plurality of partitions of the physical memory, wherein a partition of the plurality of partitions is associated with at least one physical memory address;

mapping, by the processor, the shared memory address to a physical memory address of the partition of the plurality of partitions; and sending, by the processor based on the physical memory address and after execution of the code by the processor, to another processor of the processors that is associated with the physical memory address, data for continuing to execute a program code at least partially executed by the processor.

16. The non-transitory computer-readable storage medium of claim 15, wherein mapping of the virtual memory address to the shared memory address is based on page tables, wherein an entry in the page tables maps the virtual memory address to the shared memory address.

17. The non-transitory computer-readable storage medium of claim 16, wherein the page tables are readable and modifiable by the processor and wherein the page tables are stored in the plurality of partitions.

18. The non-transitory computer-readable storage medium of claim 16, wherein each of the respective memory module of the plurality of memory modules maintains a respective part of the page tables, and wherein the respective part of the page tables, of the respective memory module, provides mapping for physical memory addresses of the respective memory module.

19. The non-transitory computer-readable storage medium of claim 18, wherein modifications to the page tables occur via a modifying device communicating messages to the plurality of memory modules, and wherein at least one of the memory modules is configured to send a confirmation to the modifying device that a communicated message has been received and a respective modification has been entered.

20. The non-transitory computer-readable storage medium of claim 16, wherein one or more of the respective memory modules of the plurality of memory modules maintains page tables for itself and other memory modules, wherein modifications to the page tables occur via a modifying device broadcasting messages to the plurality of memory modules, and wherein one or more of the plurality of memory modules perform the modifications to the page tables on its copy of the page tables.

* * * * *